(12) United States Patent
Ushijima

(10) Patent No.: US 10,908,714 B2
(45) Date of Patent: Feb. 2, 2021

(54) PORTABLE INFORMATION CODE DISPLAY APPARATUS

(71) Applicant: DENSO WAVE INCORPORATED, Aichi-pref. (JP)

(72) Inventor: Takao Ushijima, Toyoake (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 102 days.

(21) Appl. No.: 14/961,223

(22) Filed: Dec. 7, 2015

(65) Prior Publication Data

US 2016/0163288 A1    Jun. 9, 2016

(30) Foreign Application Priority Data

Dec. 5, 2014   (JP) ................................ 2014-247160
Nov. 5, 2015   (JP) ................................ 2015-217302

(51) Int. Cl.
*G06F 3/041*     (2006.01)
*G09G 3/34*      (2006.01)
*G06F 3/147*     (2006.01)

(52) U.S. Cl.
CPC ............ *G06F 3/0412* (2013.01); *G06F 3/147* (2013.01); *G09G 3/3406* (2013.01); *G09G 2330/021* (2013.01); *G09G 2340/0492* (2013.01); *G09G 2380/04* (2013.01)

(58) Field of Classification Search
CPC ....... G06T 11/001; G06T 11/60; G06T 3/606; G06T 3/00; G06T 7/40; G09G 2340/0492; G09G 2340/0407; G09G 3/3406; G09G 2330/021; G09G 2380/04; G09G 2340/14; G09G 2340/145; G06F 3/0485; G06F 3/0412; G06F 3/147; G06K 7/10; G06K 7/14; G06K 7/1404; G06K 7/1408
USPC ........ 345/581, 619, 649, 656, 659, 660, 672
See application file for complete search history.

(56) References Cited

U.S. PATENT DOCUMENTS

| | | | |
|---|---|---|---|
| 2014/0063078 A1* | 3/2014 | Choi ........................ | G09G 3/22 345/690 |
| 2014/0157114 A1* | 6/2014 | Halme .................. | G06Q 10/10 715/249 |
| 2016/0048826 A1* | 2/2016 | Fefferman .......... | G06Q 20/3274 705/23 |

FOREIGN PATENT DOCUMENTS

| | | |
|---|---|---|
| JP | 2006-303562 A | 11/2006 |
| JP | 2009-271553 A | 11/2009 |

* cited by examiner

*Primary Examiner* — Ke Xiao
*Assistant Examiner* — Andrew Shin
(74) *Attorney, Agent, or Firm* — Oliff PLC

(57) ABSTRACT

There is provided a portable information code display apparatus. The apparatus includes a display unit that is capable of displaying an image in addition to a direction detecting unit and a display control unit. The direction detecting unit is capable of detecting that the display unit is oriented is a predetermined orientation. The display control unit controlling display performed in the display unit. Practically, the display control unit displays an information code on the display unit in a predetermined readable state in which the information is readable and maintains the display of the information code in the readable state, when the direction detecting unit detects that the display unit is oriented in the predetermined orientation.

19 Claims, 23 Drawing Sheets

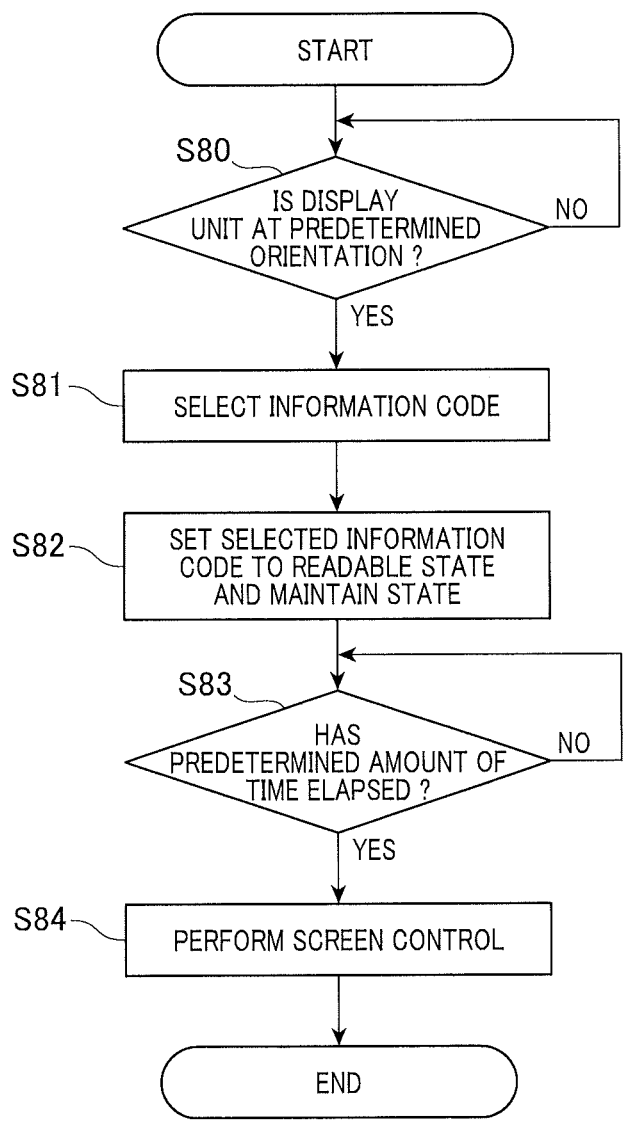

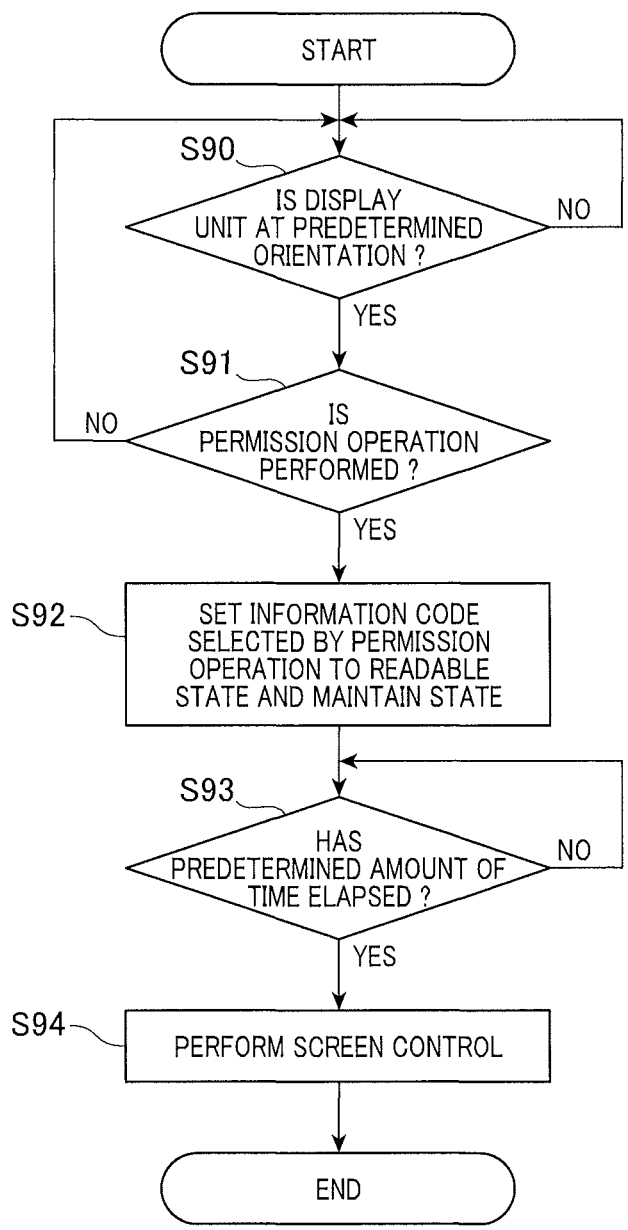

PORTABLE INFORMATION CODE DISPLAY APPARATUS

CROSS-REFERENCE TO RELATED APPLICATIONS

This application is based on and claims the benefit of priority from earlier Japanese Patent Applications No. 2014-247160 filed Dec. 5, 2014 and No. 2015-217302 filed Nov. 5, 2015, the descriptions of which are incorporated herein by reference.

BACKGROUND

Technical Field

The present invention relates to an apparatus on which an information code is displayed, and in particular, to a portable information code display apparatus.

Related Art

Information codes are being used in increasingly wider applications over the recent years. For example, information codes are also being used in such a manner that the information code is displayed on a portable terminal, such as a tablet terminal or a smartphone, in addition to media such as paper, and read by another apparatus. A technique such as that in JP-A-2009-271553, for example, has been proposed as a technique for using an information code displayed on a display apparatus.

In a portable display apparatus that is provided with a function for displaying an information code, the display screen may not be in a state that is suitable for reading at the timing which at an attempt is made to read the information code For example, in recent years, portable terminals have been proposed in which the backlight is turned OFF or power to a display is turned OFF when a button, a touch panel, or the like is not operated over a certain period. When an information code is displayed in a portable terminal such as this and is to be read by an external reading apparatus, should it take time for the information code to be actually held over the reading apparatus and read after a display operation to display the information code on the display is performed, the backlight may be turned OFF or the power to the display may be turned OFF before the reading apparatus completes reading the information code. As a result, the reading apparatus is not able to read the information code. In particular, when reading is performed, the display screen has to be facing the reading apparatus side. When the display screen is facing the reading apparatus side in this way, the operator has difficulty confirming the display state of the display screen. Therefore, a situation may occur in which the operator continues to hold the information code over the reading apparatus without realizing that the backlight or the power to the display is in the OFF state.

This type of issue is also a concern in configurations in which the display apparatus switches between displaying an information code and another image, as in the display apparatus in JP-A-2009-271553, and in configurations in which the information code is displayed as part of a video. For example, in a configuration in which the display apparatus switches between a state in which an information code is displayed in a readable format and a state in which another image (such as a logo mark image in the example in JP-A-2009-271553) is displayed, the other image that is not the information code may be displayed, or the information code may be deformed and displayed in a format that is difficult to read, at the timing at which the display apparatus is held over the reading apparatus and an attempt to read the information code is made. In this way, in a configuration in which there is no guarantee that the information code will be displayed in a readable manner at the timing at which the user holds the display apparatus over the reading apparatus, problems occur in that time may be required for the information code to be successfully read after being held over the reading apparatus, and reading of the information code tends to fail.

The situations described above are merely examples. In addition to these situations, various instances are presumed in which the display screen of the portable display apparatus enters a state in which the information code is difficult to read at the timing at which an attempt to read the information code is made. In all of these instances, problems, such as reading delay or failure, tend to occur.

SUMMARY

It is thus desired to solve the above-described issues and to provide a portable information code display apparatus that is capable of displaying an information code, in which the portable information code display apparatus is configured such that problems, such as reading delay or failure, do not easily occur when an operation to hold the portable information code display apparatus to a reading apparatus is performed to enable the reading apparatus to read the information code.

As an exemplary embodiment is characterized by including a display unit that is capable of displaying an image; a display control unit that is capable of controlling display performed in the display unit; and a direction detecting unit that is at least capable of detecting that a direction in which the display unit is oriented is a predetermined orientation. The display control unit displays at least an information code in a predetermined readable state on the display unit and maintains the display in the state in which the information code is readable, when the direction detecting unit detects that the orientation of the display unit is the predetermined orientation.

In the exemplary embodiment, situations in which only an unreadable image or a difficult-to-read image is continuously displayed while the display unit is being held towards a reading apparatus that is in a predetermined arrangement (an arrangement that enables the reading apparatus to recognize the image in the display unit that is at a "predetermined orientation") does not easily occur. Therefore, problems, such as reading delays and failures, resulting from such situations do not easily occur. For example, when a user performs a holding operation to hold the display unit at the "predetermined orientation" to the reading apparatus that is in the predetermined arrangement, the information code is displayed in a "predetermined readable state" and the state is maintained in the display unit that is being held over the reading apparatus. Therefore, the reading apparatus can more accurately and quickly recognize the configuration of the information code that is displayed on the display unit being held over the reading apparatus.

It is preferred that the display control unit switches the display state of the display unit to a state in which the information code is displayed in a readable manner, when the direction detecting unit detects that the orientation of the display unit is the predetermined orientation at least when the information code is not being displayed in a readable state on the display unit.

As a result of this configuration, even when the information code is not displayed in a readable state on the display unit, the display unit can be forcibly switched to a "state in which the information code is displayed in a readable state" by the orientation of the display unit being changed to the "predetermined orientation". Therefore, even should the display unit be in an unreadable state (such as displaying a screen on which the information code is not present or a screen on which the information code is in an unreadable state) immediately before reading, the user does not need to be forced to perform complicated operations to switch the screen. The burden placed on the user and delays in reading resulting from complicated operations can be more effectively reduced.

It is also preferred that the display control unit switches the display state of the display unit to the state in which the information code is displayed in a readable state, when the direction detecting unit detects that the orientation of the display unit is a predetermined orientation while at least a predetermined default screen or a display screen of an application program that does not involve display of the information code is displayed on the display unit.

In this example, even should the default screen or the display screen of an application program that does not involve display of the information code be displayed on the display unit immediately before reading, the screen can be easily and quickly switched to the screen for enabling reading of the information code (the screen on which the information code is displayed in a readable state) by an operation in which the orientation of the display unit is changed to the predetermined orientation. Use of the above-described configuration is particularly useful when, for example, the display apparatus is used in a manner in which the amount of time during which the default screen or the display screen of the an application program that does not involve display of the information code is displayed is longer than the amount of time over which the information code is displayed.

Still preferably, when a predetermined permission condition under which display of an information code is permitted is met and the direction detecting unit detects that the orientation of the display unit is the predetermined orientation, the display control unit displays the information code in a readable state on the display unit and maintains the display in which the information code is in the readable state.

In this example, a characteristic operation in which "the information code is displayed in a readable state when the orientation of the display unit is a predetermined orientation" can be performed only when the predetermined permission condition is met. This configuration is particularly advantageous for uses in which the characteristic operation should not be uniformly performed.

In another example, the display control unit performs control to switch the display in the display unit to a predetermined suppressed state when a predetermined suppression condition is met. When the direction detecting unit detects that the orientation of the display unit is the predetermined orientation in the suppressed state, the display control unit terminates the predetermined suppressed state. The display control unit displays the information code in a readable state on the display unit and maintains the display in which the information code is in the readable state.

In this example, the display in the display unit can be switched to a suppressed state when the predetermined suppression condition is met. Power saving can be more easily performed. Meanwhile, in a power saving configuration such as this, when a reading operation is performed while the display apparatus is in the suppressed state, a problem arises in that reading failure tends to occur. However, in this example, the suppressed state is terminated when an operation to hold the display unit at the predetermined orientation is performed in the suppressed state. The information code can be displayed in a readable state. Therefore, reading defects and the like resulting from the reading operation being performed while in the suppressed state do not easily occur.

Still preferably, the readable state is at least a state in which light is irradiated in a predetermined irradiation state from a backlight in the display unit. The display control unit performs control to turn OFF the backlight of the display unit or suppression control to suppress the irradiation of light from the backlight of the display unit to be lower than that in the predetermined irradiation state when the predetermined suppression condition is met. When the direction detecting unit detects that the orientation of the display unit is the predetermined orientation in the predetermined suppression state, the display control unit terminates the predetermined suppression state. The display control unit maintains the state in which the information code is displayed while irradiating light in the predetermined irradiation state from the backlight of the display unit.

In this example, backlight-OFF control or suppression control to suppress the irradiation of light from the backlight can be performed when the predetermined suppression condition is met. Power consumption by the backlight, of which power consumption is a concern, can be effectively reduced. Meanwhile, in a power saving configuration such as this, when a reading operation is performed in a state in which the backlight is turned OFF or the irradiation from the backlight is suppressed, recognition of the information code on the reading apparatus side becomes difficult. A problem arises in that reading failure tends to occur. However, in this example, when an operation to hold the display unit at the predetermined orientation is performed while the backlight-OFF control or the suppression control is being performed, the backlight can be returned to the predetermined irradiation state. The information code can be displayed in a clear and readable state. Therefore, reading defects and the like resulting from the reading operation being performed during the backlight-OFF control or the suppression control does not easily occur.

Still preferably, the display control unit performs control to switch the display in the display unit to the predetermined suppressed state when the predetermined suppression condition is met. When the predetermined suppression condition is met when the direction detecting unit has detected that the orientation of the display unit is the predetermined orientation, the display control unit displays the information code in a readable state on the display unit without switching the display in the display unit to the predetermined suppressed state. The display control unit maintains the display in which the information code is in a readable state.

In the embodiment, the display in the display unit can be switched to the "predetermined suppressed state" when the "predetermined suppression condition" is met. Power saving can be more easily performed. Meanwhile, in a power saving configuration such as this, the "predetermined suppression condition" may be met after the operation to hold the display unit at the predetermined orientation is performed and the information code is displayed in a readable state. In this case, display may be suppressed before reading by the reading apparatus is completed, and reading failure tends to occur. In this regard, in this example, when the "predetermined suppression condition" is met when the orientation of the display unit is detected as being the predetermined orientation, the information code can be displayed in a readable state and the state can be maintained, without the display in the display unit being switched to the "predetermined suppressed state". That is, the display unit being forcibly switched to the "predetermined suppressed state" during the period over which the above-described holding operation (the operation in which the display unit is held at the predetermined orientation) is performed can be more easily prevented. Problems, such as reading failure, resulting from the display being suppressed before reading is completed can be more easily prevented.

In this example, the readable state is at least a state in which light is irradiated in a predetermined irradiation state from a backlight in the display unit. The display control unit performs control to turn OFF the backlight of the display unit or suppression control to suppress the irradiation of light from the backlight of the display unit to be lower than that in the predetermined irradiation state when the predetermined suppression condition is met. When the predetermined suppression condition is met when the direction detecting unit has detected that the orientation of the display unit is the predetermined orientation in the predetermined suppression state, the display control unit does not perform the OFF control or the suppression control. The display control unit displays the information code in a readable state on the display unit and maintains the display in which the information code is in a readable state.

In this case, backlight-OFF control or suppression control to suppress the irradiation of light from the backlight can be performed when the "predetermined suppression condition" is met. Power consumption by the backlight, of which power consumption is a concern, can be effectively reduced. Meanwhile, in a power saving configuration such as this, even when the information code is being displayed in a readable state by the operation in which the display unit is held at the predetermined orientation, the backlight-OFF control or the suppression control is performed when the "predetermined suppression condition" is met. Such backlight-OFF control or suppression control may be performed before reading by the reading apparatus is completed. In this case, reading failure tends to occur. In this regard, in this example, when the "predetermined suppression condition" is met when the orientation of the display unit is detected as being the predetermined orientation, the backlight-OFF control and the suppression control are not performed. The information code is displayed in a readable state and the state is maintained. That is, the backlight being forcibly switched to the OFF state or the suppressed state during the period over which the above-described holding operation (the operation in which the display unit is held at the predetermined orientation) is performed can be more easily prevented. Reading failure resulting from the backlight being suppressed before reading is completed can be more easily prevented.

In another example, the direction detecting unit is capable of detecting a state in which the display unit is oriented vertically downward or vertically downward at an angle. When the direction detecting unit detects the state in which the display unit is oriented vertically downward or vertically downward at an angle, the display control unit displays the information code in a readable state on the display unit, and maintains the display in which the information code is in a readable state.

This configuration is advantageous when the display apparatus is to be used such that the display unit is held such as to be oriented downward or downward at an angle (such as when the reading apparatus is arranged such as to be capable of recognizing the display of the display unit when the display unit is oriented downward or downward at an angle). In particular, when the display apparatus is used in a manner in which the display unit is held such as to be oriented downward or downward at an angle in this way, the user cannot easily see the display unit during reading. Therefore, when reading delay or failure occurs, a problem arises in that the user cannot easily identify whether the reading delay or failure has occurred as a result of display timing being off, or as a result of other factors. In the present configuration, delays and failures caused by at least the display timing being off can be significantly reduced. Therefore, the above-described problem can be more easily handled.

Other exemplary embodiments and advantages resulting therefrom will be detailed as follows together with the accompanying drawings.

BRIEF DESCRIPTION OF THE DRAWINGS

In the accompanying drawings:

FIG. 19 is a block diagram of an example of an electrical configuration of the portable information code display apparatus according to the eighth embodiment and the like;

FIG. 20 is a flowchart of an example of the flow of a display process in a portable information code display apparatus according to a ninth embodiment;

FIG. 23 is a flowchart of an example of the flow of a display process in a portable information code display apparatus according to a tenth embodiment.

DETAILED DESCRIPTION OF THE PREFERRED EMBODIMENTS

First Embodiment

A first embodiment actualizing the present invention will hereinafter be described with reference to the drawings.

Overview of a Portable Information Code Display Apparatus

First, an overview of a portable information code display apparatus 10 will be described. The portable information code display apparatus (also referred to, hereafter, as simply a display apparatus) 10 shown in FIG. 1, FIG. 2, and the like is configured such as to be used while being gripped by a user. For example, the display apparatus 10 is configured as a portable information terminal that is carried by the user and used in various locations. The display apparatus 10 is provided with a function for generating and displaying an information code C, such as a barcode or a two-dimensional code. The display apparatus 10 is merely required to be a portable information apparatus that has a display, such as a mobile phone, a smartphone, or a wearable terminal. Functions of the display apparatus 10, other than the display function, are not particularly limited.

The outer shell of the display apparatus 10 is formed by a case that is, for example, composed of a resin material or a metal material. In addition, a display unit 12, an operating unit 13 (such as a touch panel), and the like are assembled in the case, thereby forming an integrated apparatus structure. The display unit 12 is capable of displaying an image. The operating unit 13 is used for information input operations performed from outside of the display apparatus 10.

Figure 2:
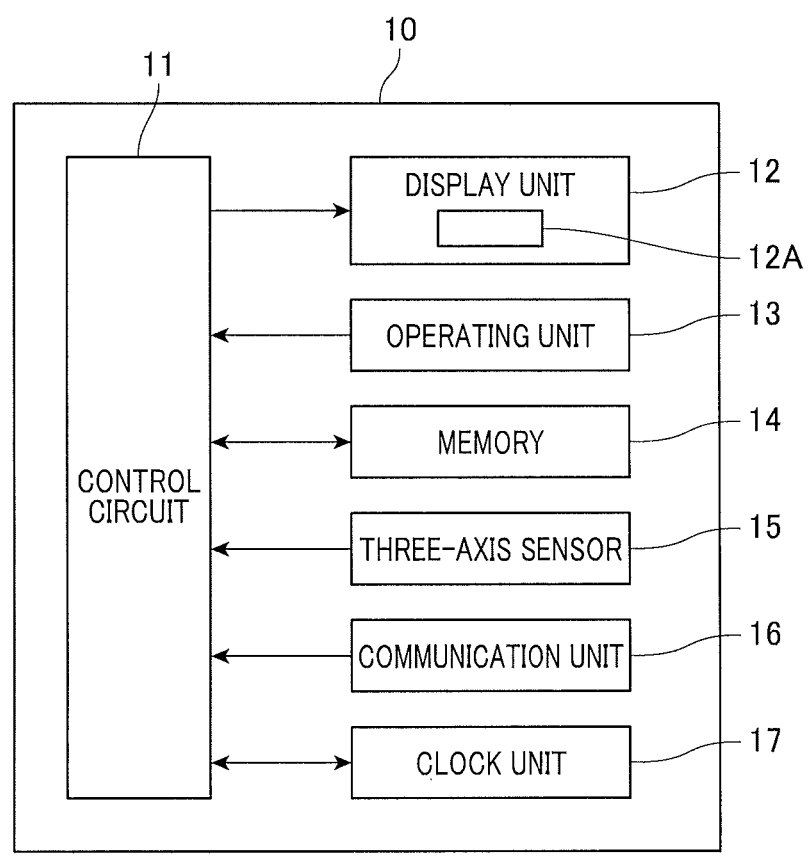
FIG. 2 is a block diagram of an example of an electrical configuration of the portable information code display apparatus according to the first embodiment.

As shown in FIG. 2, the display apparatus 10 is mainly configured by a control circuit 11, the display unit 12, the operating unit 13, a memory 14, a three-axis sensor 15, a communication unit 16, a clock unit 17, and the like. These components are mounted on a printed wiring board (not shown) or disposed within the case.

The memory 14 is configured by a publicly known storage device, such as a semiconductor memory device. For example, a random access memory (RAM), a read-only memory (ROM), and other non-volatile memories correspond to the memory 14. Of the memory 14, the RAM is configured such that a working area and the like can be secured therein. The working area is used by the control circuit 11 during processing, such as arithmetic operations and logic operations. The ROM stores therein, in advance, predetermined programs that enable a process for generating the information code C, described hereafter, and the like to be performed. The ROM also stores therein, in advance, system programs and the like that enable control of hardware, such as the display unit 12 and the three-axis sensor 15.

The control circuit 11 is configured by a microcomputer or the like that is capable of controlling the overall display apparatus 10. The control circuit 11 is composed of a central processing unit (CPU), a system bus, an input/output interface, and the like, and is provided with an information processing function. Various input/output units (peripheral units) are connected to the control circuit 11, via an input/output interface provided in the control circuit 11. In the present configuration, the display unit 12, the operating unit 13, the memory 14, the three-axis sensor 15, the communication unit 16, the clock unit 17, and the like are connected to the control circuit 11. The control circuit 11 corresponds to an example of a display control unit and is configured to be capable of controlling display performed by the display unit 12.

The operating unit 13 is composed of an operating switch, such as a function key or a numeric keypad. Alternatively, the operating unit 13 is configured by a touch panel or the like. For example, when a user of the display apparatus 10 operates the operating unit 13, the operating unit 13 provides the control circuit 11 with an operation signal that is based on the operation content. The communication unit 16 communicates with an external apparatus by, for example, a publicly known communication format (such as by wireless local area network (LAN) communication, infrared communication, or Bluetooth communication). The clock unit 17 is configured by a publicly known clock circuit or the like, and is communicably connected to the control circuit 11. The clock unit 17 functions to keep time and to measure an amount of time elapsed from a predetermined point in time (such as when the operating unit 13 is operated).

The three-axis sensor 15 and the control circuit 11 correspond to an example of a "direction detecting unit". The three-axis sensor 15 and the control circuit 11 are configured to be capable of detecting that the direction in which the display unit 12 is oriented is a predetermined orientation. The three-axis sensor 15 is configured by a publicly known acceleration sensor or the like. In the present configuration, the three-axis sensor 15 measures the respective accelerations in three predetermined directions of the display apparatus 10 that are perpendicular to one another.

Figure 4:
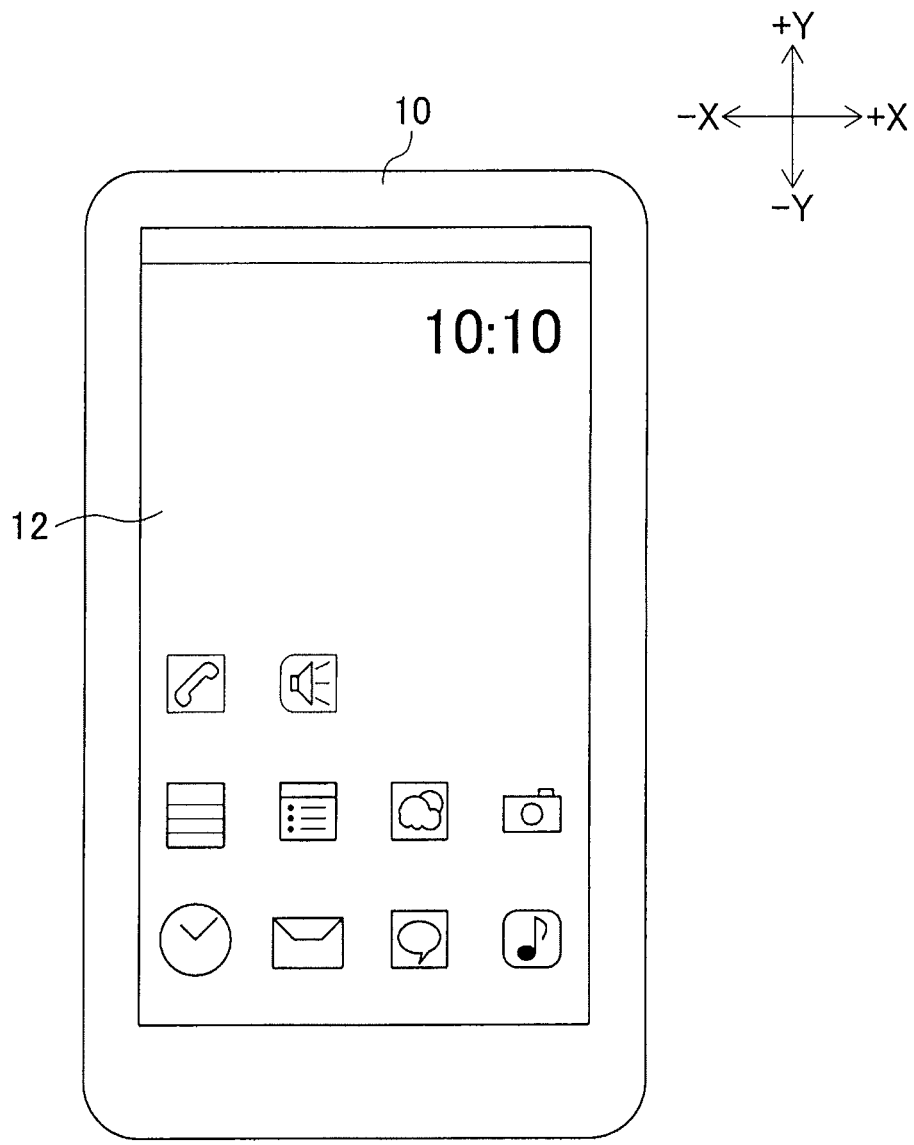
FIG. 4 is an explanatory diagram of an example in which a default screen is displayed on the portable information code display apparatus according to the first embodiment.
Figure 7:
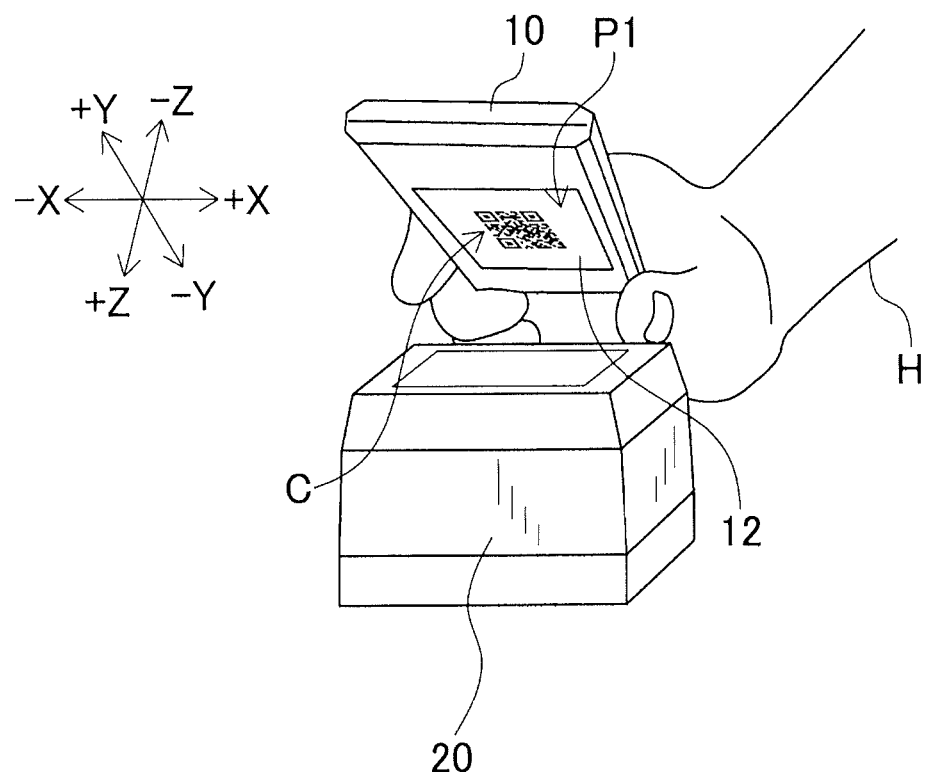
FIG. 7 is an explanatory diagram of when an operation is performed to set the display unit at a predetermined orientation in the portable information code display apparatus according to the first embodiment.

Specifically, as shown in FIG. 4, FIG. 7, and the like, a predetermined long direction of the display apparatus 10 is a Y-axis direction. The thickness direction (a direction perpendicular to the long direction and the direction in which the front surface on the display unit 12 side and a back surface opposite the front surface oppose each other) of the display apparatus 10 is a Z-axis direction (not shown). A width direction that is perpendicular to the Y-axis direction and the Z-axis direction is an X-axis direction. In addition, one side in the Z-axis direction (the side on which display by the display unit 12 is performed) is a Z-axis positive side. The other side in the Z-axis direction opposite the one side is a Z-axis negative side. Specifically, for example, a transparent plate is disposed such as to cover the display elements configuring the display unit 12.

The direction perpendicular to the outer surface (front surface) of the transparent plate is the Z-axis direction. The direction on the Z-axis positive side is the "direction in which the display unit 12 is oriented". The techniques by which the three-axis acceleration sensor identifies acceleration in a predetermined direction and the vertical direction are publicly known. Therefore, details thereof are omitted. In addition to methods disclosed in JP-A-2003-302419, JP-A-2007-325722, and the like, various other publicly known methods can be used. As a result of a configuration such as this, the respective degrees of acceleration in the X-axis direction, the Y-axis direction, and the Z-axis direction can be measured. For example, the display apparatus 10 is able to identify which orientation of the display apparatus 10 is the vertical direction.

The display unit 12 corresponds to an example of a display unit that displays an image. The display unit 12 is configured by a publicly known display apparatus, such as a liquid crystal display or an organic electroluminescent (EL) display. The display unit 12 is capable of displaying various types of information, such as the results of information processing by the control circuit 11 and the operating state of the display apparatus 10. In the description hereafter, an example in which the display unit 12 is configured as a publicly known liquid crystal display that is provided with a backlight 12A is used as a representative example.

The display unit 12 functions to display the information code C generated by the control circuit 11 as a video or as a part of still images that are switched. The information code C displayed in the display unit 12 may be a Quick Response (QR) code, a Data Matrix code, a MaxiCode, or other two-dimensional codes. The information code C may also be a one-dimensional code, such as a barcode.

Information Code Reading Apparatus

Figure 1:
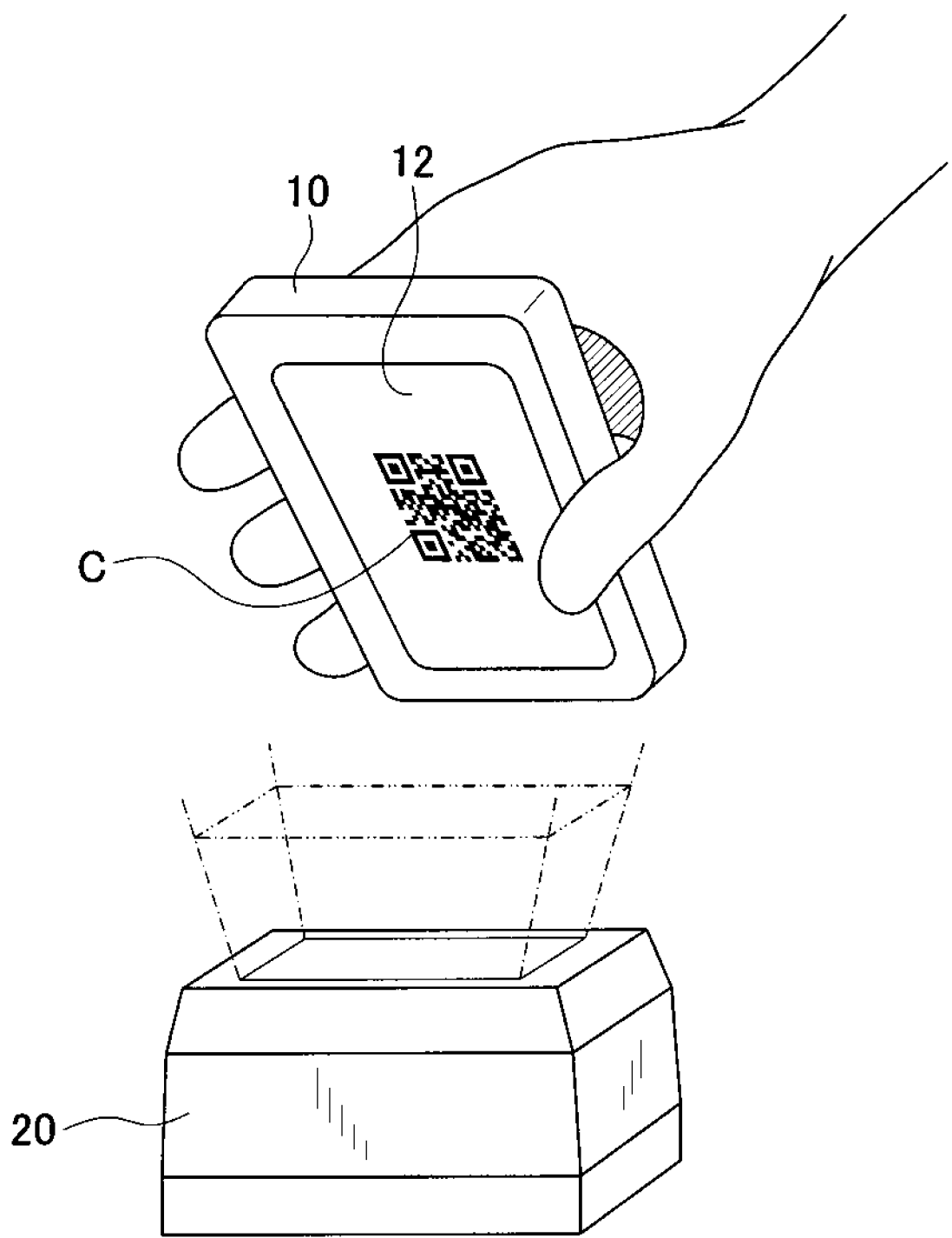
FIG. 1 is an explanatory diagram schematically showing a portable information code display apparatus according to a first embodiment and an information code reading apparatus that reads an information code displayed on the display apparatus.

Next, an information code reading apparatus 20 will be described. The information code reading apparatus (also referred to, hereafter, as simply a reading apparatus) 20 shown in FIG. 1, FIG. 3, and the like is configured, in terms of hardware, as a code reader that is capable of reading an information code. The outer shell of the reading apparatus 20 is configured by a case that houses, therein, various electronic components. The reading apparatus 20 is provided with a function for reading an information code, such as a barcode or a two-dimensional code, that is displayed in the display apparatus 10. In FIG. 1 and the like, a stationary-type information code reading apparatus 20 that can be used placed on a desk or the like is given as an example. However, the reading apparatus 10 may have a portable. In addition, the reading apparatus 10 may be used such as to be assembled onto another structure (such as a desk, a column, or a wall).

Figure 3:
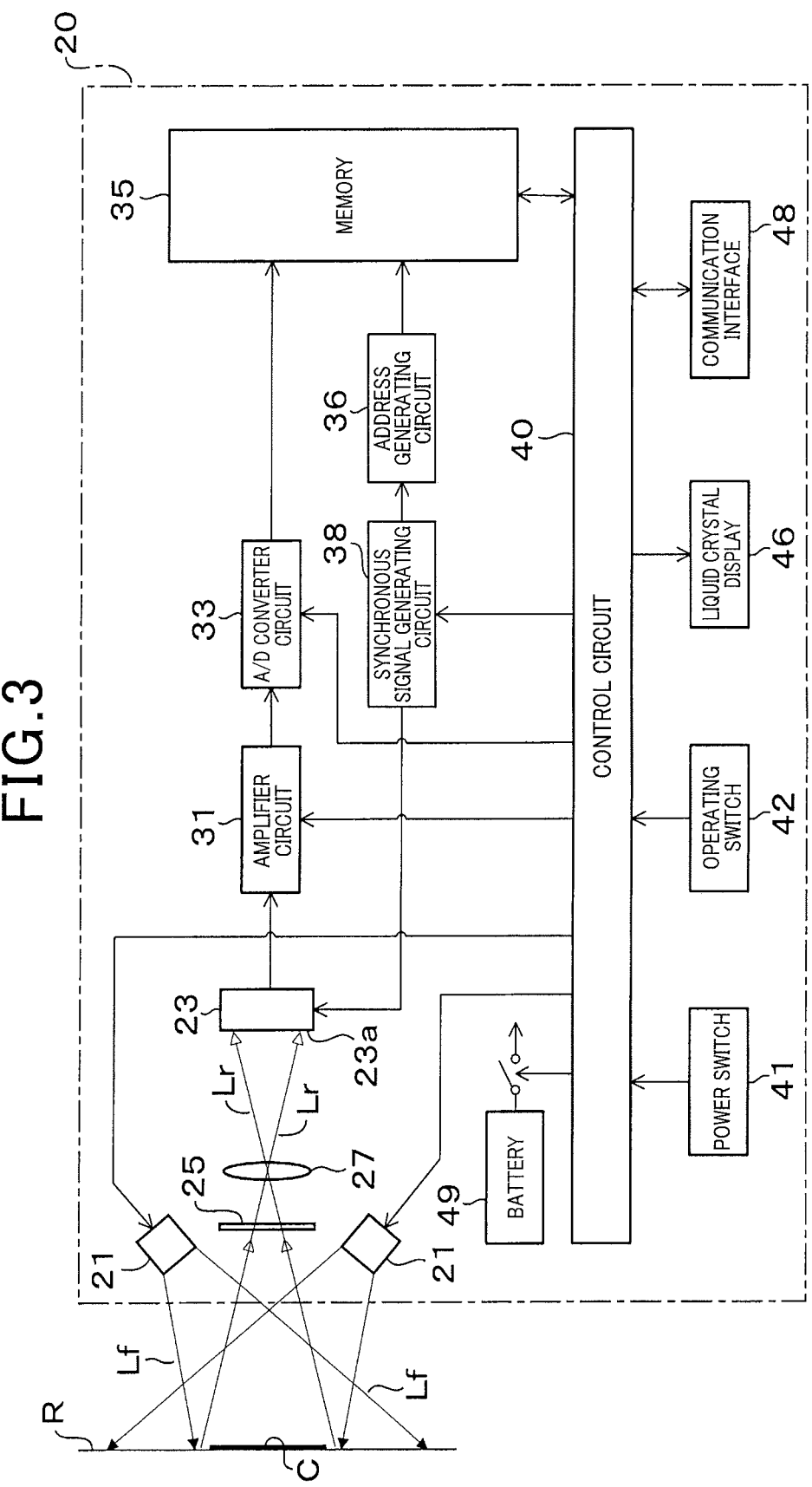
FIG. 3 is a block diagram of an example of an electrical configuration of the reading apparatus that reads an information code displayed on the portable information code display apparatus according to the first embodiment.

As shown in FIG. 3, the reading apparatus 20 is mainly configured by an optical system, a microcomputer system, and a power supply system. The optical system includes an illumination light source 21, a light receiving sensor 23, a filter 25, an imaging lens 27, and the like. The microcomputer system includes a memory 35, a control circuit 40, an operating switch 42, a liquid crystal display 46, and the like. The power supply system includes a power switch 41, a battery 49, and the like. These components are mounted on a printed wiring board (not shown) or disposed within the case (not shown).

The optical system is configured by the illumination light source 21, the light receiving sensor 23, the filter 25, the imaging lens 27, and the like. The illumination light source 21 functions as an illumination light source that is capable of emitting an illumination light Lf. For example, the illumination light source 21 is composed of a red light-emitting diode (LED), as well as a diffusing lens, a condenser lens, or the like provided on the emission side of the LED. In the present configuration, the illumination light sources 21 are provided on both sides of the light receiving sensor 23 such as to sandwich the light receiving sensor 23 therebetween. The illumination light source 21 is capable of irradiating the illumination light Lf towards a reading target R (such as the above-described display apparatus 10) via a reading opening (not shown) that is formed in the case.

The light receiving sensor 23 is capable of receiving light from the reading target R or the information code C (for example, reflected light Lr that is the illumination light Lf that has been reflected after being irradiated onto the reading target R or the information code C). For example, an area sensor in which light receiving elements are arrayed in a two-dimensional manner corresponds to the light receiving sensor 23. The light receiving element is a solid state image sensing device, such as a complementary metal-oxide-semiconductor (C-MOS) or a charge-coupled device (CCD). The light receiving sensor 23 is mounted on a printed wiring board (not shown) such that incident light that enters through the imaging lens 27 is received on a light receiving surface 23a.

The filter 25 is an optical low-pass filter that allows transmission of light having a wavelength that is equivalent to or lower than the wavelength of the reflected line Lr, and blocks transmission of light having a wavelength that exceeds the wavelength of the reflected light Lr. The filter 25 is provided between the reading opening (not shown) formed in the case and the imaging lens 27. As a result of the filter 25, unnecessary light having a wavelength exceeding the wavelength of the reflected light Lr is suppressed from entering the light receiving sensor 23. In addition, the imaging lens 27 is configured by, for example, a lens tube and a plurality of condenser lenses that are housed within the lens tube. According to the present embodiment, the imaging lens 27 functions to condense the reflected light Lr that enters the reading opening (not shown) formed in the case and form a code image of the information code C on the light receiving surface 23a of the light receiving sensor 23.

An example of the optical system is given herein. However, various other configurations may be used as long as the optical system has a publicly known configuration that enables imaging the information code C displayed in the display unit 12 composed of a liquid crystal display or the like.

The microcomputer system is configured by an amplifier circuit 31, an analog-to-digital (A/D) converter circuit 33, the memory 35, an address generating circuit 36, a synchronous signal generating circuit 38, the control circuit 40, the operating switch 42, the liquid crystal display 46, a communication interface 48, and the like. The microcomputer system is mainly configured by the control circuit 40 that is capable of functioning as a microcomputer (information processing unit) and the memory 35. The microcomputer system is capable of performing signal processing, either by hardware or software, on an image signal of the information code C imaged by the above-described optical system.

An image signal (analog signal) outputted from the light receiving sensor 23 of the optical system is inputted to the amplifier circuit 31 and amplified by a predetermined gain. The image signal is then inputted to the A/D converter circuit 33 and converted from the analog signal to a digital signal. Then, the digitalized image signal, that is, the image data (image information) is inputted to the memory 35 and collected in an image data collection area of the memory 35. The synchronous signal generating circuit 38 is capable of generating a synchronous signal for the light receiving sensor 23 and the address generating circuit 36. In addition, the address generating circuit 36 is capable of generating a storage address for the image data stored in the memory 35, based on the synchronous signal supplied from the synchronous signal generating circuit 38.

The memory 35 is configured by a publicly known storage device, such as a semiconductor memory device. For example, a RAM, a ROM, and other non-volatile memories correspond to the memory 35. Of the memory 35, the RAM is configured such that, in addition to the above-described image data collection area, a working area and a reading condition table can also be secured therein. The working area is used by the control circuit 40 during processing, such as arithmetic operations and logic operations. The ROM stores therein, in advance, predetermined programs that enable a reading process and the like to be performed. The ROM also stores therein, in advance, system programs and the like that enable control of hardware, such as the illumination light source 21 and the light receiving sensor 23.

The control circuit 40 is configured by, for example, a microcomputer that is capable of controlling the overall reading apparatus 20. The control circuit 40 is composed of a CPU, a system bus, an input/output interface, and the like, and is provided with an information processing function. Various input/output units (peripheral units) are connected to the control circuit 40, via an input/output interface provided in the control circuit 40. According to the present embodiment, the power switch 41, the operating switch 42, the liquid crystal display 46, the communication interface 48, and the like are connected to the control circuit 40. In addition, a host computer HST or the like that corresponds to a host system of the reading apparatus 20 can be connected to the communication interface 48.

The power supply system is configured by the power switch 41, the battery 49, and the like. Conduction and cut-off of drive voltage supplied from the battery 49 to each of the above-described units and circuits are controlled by ON/OFF of the power switch 41 managed by the control circuit 41. The battery 49 is a secondary battery that is capable of generating a predetermined direct-current voltage. For example, a lithium ion battery corresponds to the battery 49. In FIG. 3, an example is shown in which power supply is received from the battery 49. However, when the reading apparatus 20 is a stationary type, power supply may be received from an external commercial power source.

Display Control

Next, display control functionally performed by the display apparatus 10 will be described.

A default screen, such as that shown in FIG. 4, for example, is displayed on the display apparatus 10 after power is turned ON. Icons used to start various application programs are displayed on the default screen. In the display apparatus 10, for example, when an operation to select any of the icons displayed on the default screen, such as that in FIG. 4, (such as an operation in which the icon is touched) is performed, the application program corresponding to the icon is started and run. Programs that actualize the functions of a phone, a music player, a video player, a browser, and the like, as well as programs that provide an electronic mail function, a clock display function, an image capturing function, an electronic money settlement function, and the like are present as the application programs. The respective icons corresponding to these programs are displayed on the default screen shown in FIG. 4.

For example, when an icon corresponding to the browser is selected, among the icons displayed on the default screen shown in FIG. 4, the browser program is started. A website on the Internet can be displayed as in FIG. 5. The display example is not limited to this example. For example, when an icon corresponding to a clock program is selected, the clock program is started and a clock screen is displayed. Alternatively, when an icon corresponding to a phone program is selected, the phone program is started and a screen used to make a phone call or the like is displayed.

Figure 5:
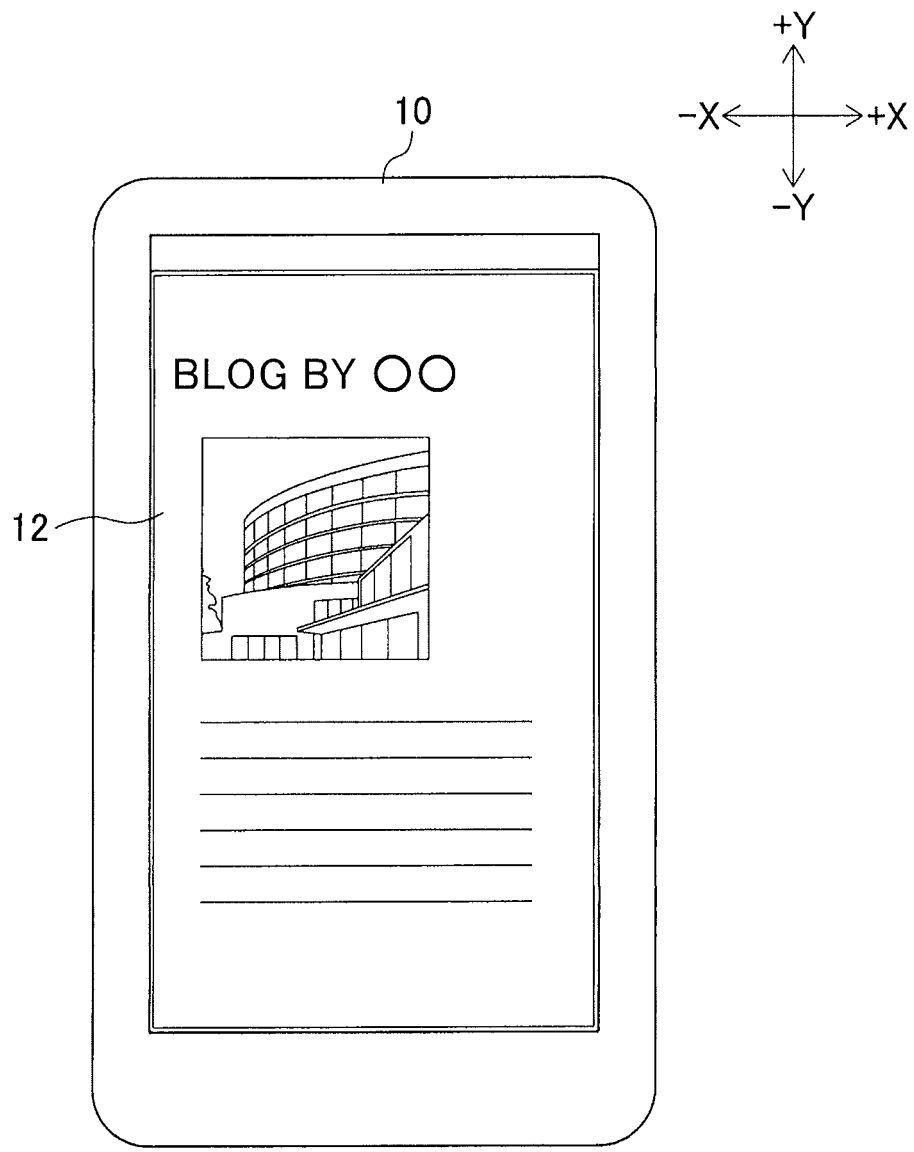
FIG. 5 is an explanatory diagram of an example of a display screen of an application program in the portable information code display apparatus according to the first embodiment.
Figure 9:
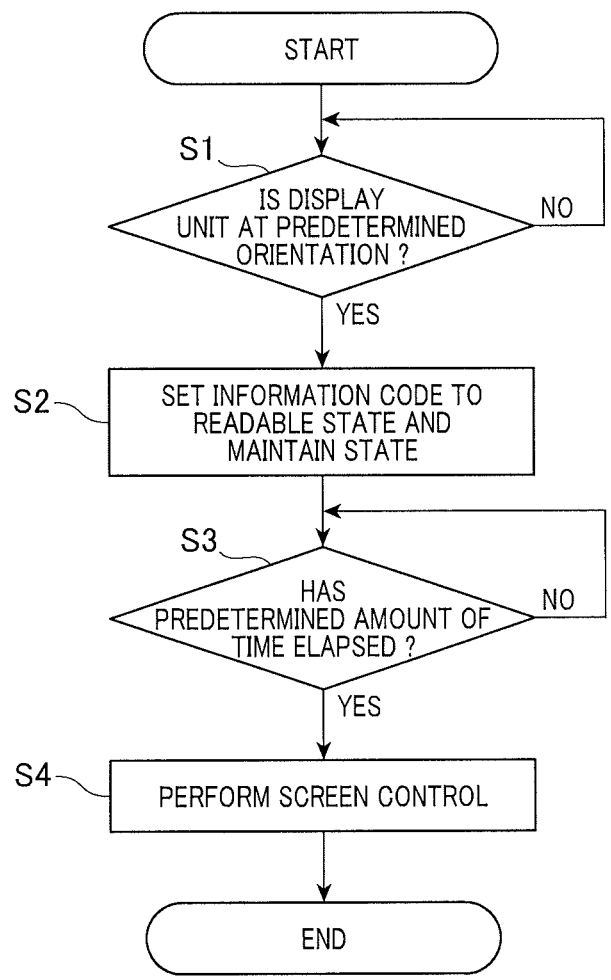
FIG. 9 is a flowchart of an example of the flow of a display process in the portable information code display apparatus according to the first embodiment.

Meanwhile, while the display apparatus 10 is operating, a program for performing a process such as that in FIG. 9 is run in parallel with display control of the default screen shown in FIG. 4, display control by an application program such as that in FIG. 5, and the like. The process in FIG. 9 is performed, for example, after power is turned ON or after A process at S4 is completed. In accompaniment with the start of the process in FIG. 9, the display apparatus 10 performs detection of the orientation of the display apparatus 10, and determines whether or not the direction in which the display unit 12 is oriented is a "predetermined orientation" (S1). In the process at S1, the display apparatus 10 determines whether or not the three-axis sensor 15 has detected a state in which the display unit 12 is oriented vertically downward or vertically downward at an angle, that is, obliquely downward.

Figure 6:
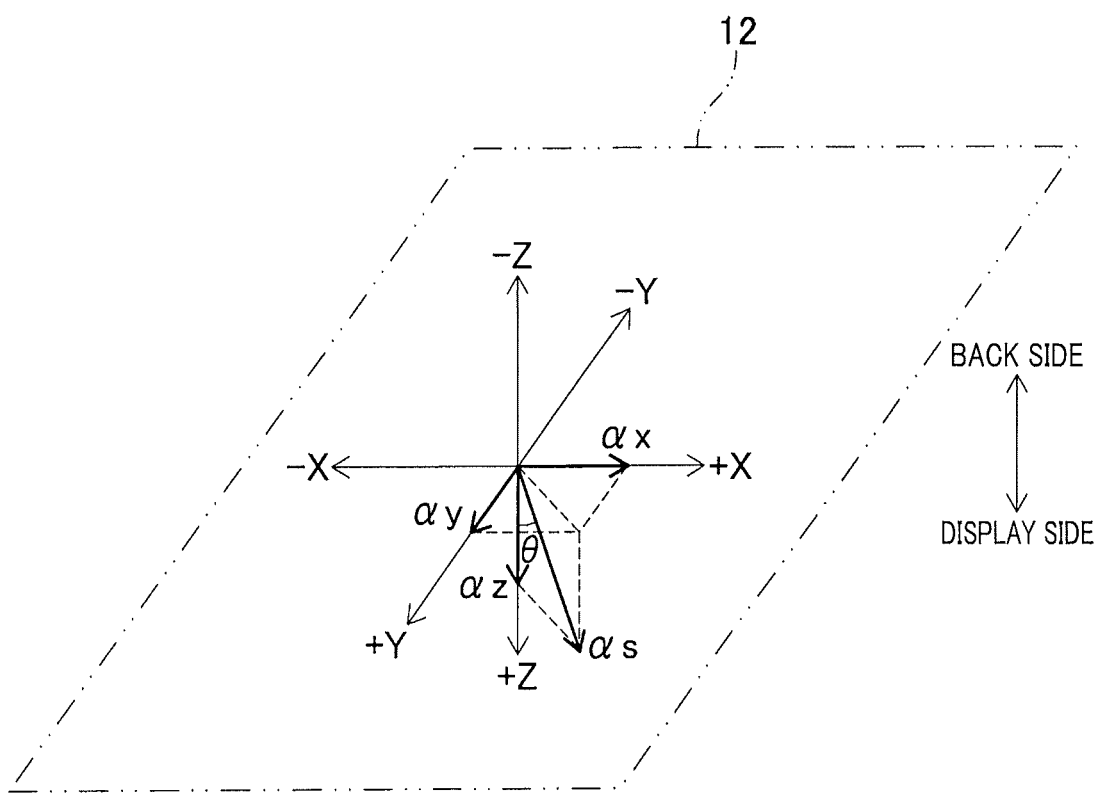
FIG. 6 is an explanatory diagram for explaining an angle formed by the orientation of a resultant acceleration, which is determined from acceleration in each axial direction detected by a three-axis sensor, and the direction in which a display unit is oriented (Z-axis positive direction)

In the present configuration, as shown in FIG. 6, the three-axis sensor 15 continuously detects the respective accelerations $\alpha x$, $\alpha y$, $\alpha z$ in the X-, Y-, and Z-axis directions. The orientation of an acceleration as that is applied to the display apparatus 10 can be continuously identified by the accelerations $\alpha x$, $\alpha y$, $\alpha z$ being combined. In the process at S1, which is performed every predetermined short amount of time, the display apparatus 10 determines an angle $\theta$ formed by the combined acceleration $\alpha s$ and the Z-axis positive direction at the time at which the process at S1 is performed.

The display apparatus 10 determines whether or not the angle is 0° or greater and a predetermined threshold $\theta a$ (such as 20°) or less over a certain amount of time (an amount of time that is shorter than a continuous display time of other images P2 and P3, described above, such as 0.1 seconds or 0.01 seconds) or longer. In other words, when the angle $\theta$ formed by the direction of the combined acceleration αs and the Z-axis positive direction is 0° or greater and the predetermined threshold θa or less, it is presumed that the orientation of gravitational acceleration and the orientation of the Z-axis positive direction are close. The likelihood is high that the display unit 12 is oriented downward or oriented downward at an angle. Therefore, the display apparatus 10 detects a state such as this at S2. In the present configuration, the angle θ formed by the combined acceleration αs and the Z-axis positive direction is a "value indicating the direction in which the display unit 12 (display unit) is oriented". "When the angle θ is 0° or greater and the predetermined threshold θa or less" is "when the direction of the display unit 12 (display unit or display means) detected by a direction detecting unit is a 'predetermined orientation'". In addition, the "direction in which the display unit 12 is oriented when the angle θ is 0° or greater and the predetermined threshold θa or less" is the "predetermined orientation".

Figure 8:
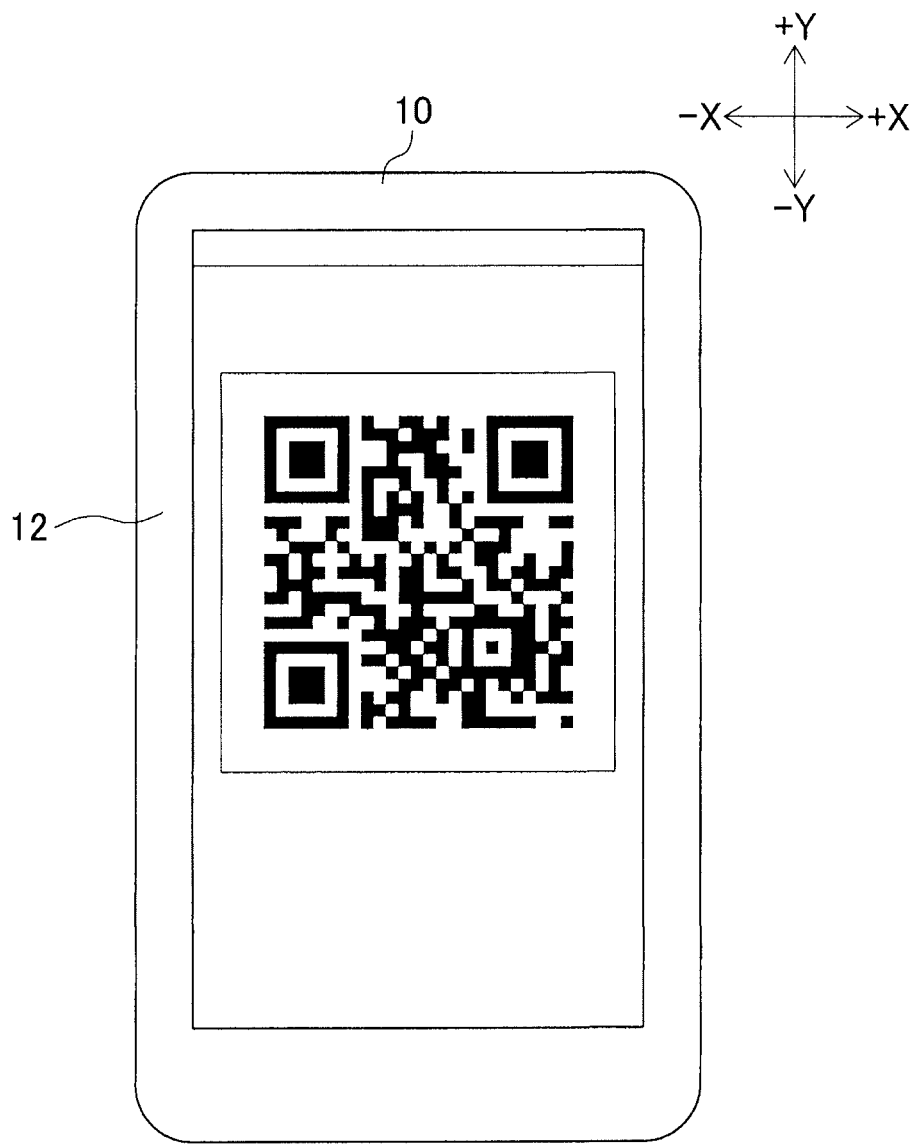
FIG. 8 is an explanatory diagram of a display example of an information code when the operation is performed to set the display unit at the predetermined orientation in the portable information code display apparatus according to the first embodiment.

When detected that the direction in which the display unit 12 is oriented is the "predetermined orientation" at S1 (that is, when detected that the angle θ is 0° or greater and the predetermined threshold θa or less over the certain amount of time or longer), the display apparatus 10 switches the display in the display unit 12 to a pre-established image of the information code C (FIG. 7, FIG. 8, and the like). In a state in which the image of the information code C (the QR code (registered trademark) in the examples in FIG. 7 and FIG. 8) is displayed, the display is set to a readable state and maintained (fixed) (S2).

"When detected that the angle θ is 0° or greater and the predetermined threshold θa or less over the certain amount of time or longer", described above, corresponds to "when detected that the display apparatus 10 is in a state in which the display unit 12 is oriented vertically downward or vertically downward at an angle".

In this way, in the present configuration, when the display unit 12 is in a state of being oriented vertically downward or vertically downward at an angle as a result of the user holding the display apparatus 10 over the reading apparatus 20, as shown in FIG. 7, the angle θ is 0° or greater and the predetermined threshold θa or less over the certain amount of time or longer. Therefore, the display apparatus 10 proceeds to Yes at S1. The display apparatus 10 interrupts the display of the default screen such as that in FIG. 4 or the display of an application program such as that in FIG. 5, and continuously displays the image of the information code C such as that in FIG. 8.

Meanwhile, during a period when the orientation of the display unit 12 is not the "predetermined orientation" after the start of the process in FIG. 9 (that is, during a period in which the condition "the angle θ is 0° or greater and the predetermined threshold θa or less over the certain amount of time or longer" is not met), the display apparatus 10 continues to proceeds to No in the process at S1, which is performed every predetermined short amount of time. During this period, the display apparatus 10 continues the display of the default screen shown in FIG. 4 or the display based on an application program such as that in FIG. 5.

As the information code C that is displayed in the process at S2, for example, an information code that had been displayed most recently before the time at which the process at S2 is performed may be displayed. Alternatively, an information code that had been generated most recently before the time at which the process at S2 is performed may be displayed. Alternatively, an information code that has been registered in advance for the purpose of being displayed in the process at S2 may be displayed. When an information code such as these is not present, the process at FIG. 9 may not be performed.

After the display apparatus 10 is "in a state in which the information code C is continuously displayed such as to be readable by the information code reading apparatus 20" as a result of the process at S2, the display apparatus 10 continues performing this display control until the elapse of a predetermined amount of time (such as 5 seconds). Meanwhile, after the display apparatus 10 is "in a state in which the information code C is continuously displayed such as to be readable by the information code reading apparatus 20" as a result of the process at S2," when determined that the predetermined amount of time (such as 5 seconds) has elapsed in this display state, the display apparatus 1 proceeds to Yes at S3. The display apparatus 10 then performs a screen control process at S4. As a result of a configuration such as this, when the display unit 12 is held over the reading apparatus 20 during the period from after the display apparatus 1 has proceeded to Yes at S1 until the display apparatus 1 proceeds to Yes at S3, the information code displayed on the display unit 12 can be read by the reading apparatus 20 with more certainty.

In the present configuration, the control circuit 11 corresponds to an example of the display control unit. When the direction detecting unit detects that the orientation of the display unit 12 is the "predetermined orientation" (when the display apparatus 10 proceeds to Yes at S1), the control circuit 11 controls the display unit 12 so as to be in a state in which the information code C is displayed in a readable state. In addition, the control circuit 11 maintains this state (the state in which the information code C is displayed in a readable state) over a certain amount of time until a predetermined code display release condition is met (that is, until the display apparatus 10 proceeds to Yes at S3).

In addition, in the present configuration, for example, the elapse of a certain amount of time after the display apparatus 10 proceeds to Yes at S2 (that is, the elapse of a predetermined amount of time after detection of the state in which the display unit 12 (display unit or display means) is oriented vertically downward or vertically downward at an angle) corresponds to the "predetermined release condition being met". In the example in FIG. 9, when the predetermined amount of time elapses after proceeding to Yes at S2, the display apparatus 10 proceeds to Yes at S3 and performs screen control at S4. However, the display apparatus 10 may proceed to Yes at S3 when a predetermined release operation is performed on the operating unit 13 after proceeding to Yes at S1. In this case, the release operation being performed corresponds to the "predetermined release condition being met".

In the process in FIG. 9, when proceeding to Yes at S3, the display apparatus 10 performs the predetermined screen control process (S4). The control process performed at S4 includes various types of processes, such as a backlight-OFF process, a process for lowering the backlight 12A from that at S2, a process for displaying a screen differing from the screen at S2, a screen display-OFF process, a display unit power-OFF process, a display apparatus 10 power-OFF process, and a process for returning to the display screen before the process at S2. Specifically, control for reducing power consumption from that of the display state at S2 can be suitably used. For example, an operation to completely terminate display in the display unit 12 may be performed. Alternatively, control may be performed to reduce power while maintaining the display in the display unit 12 (such as control to turn OFF the backlight 12A, control to reduce the amount of backlight, or control to display a black screen). Alternatively, sleep control in which the CPU mounted in the display apparatus 10 is intermittently driven or a driving clock is suppressed, or the like may be performed.

Alternatively, as the control process performed at S4, a process for returning to the display screen before the process at S2 may be performed. For example, when the browser is started and the screen of a predetermined website on the Internet is displayed on the display unit 12 before the process at S2, when the display apparatus 10 proceeds to Yes at S3 after displaying the information code C at S2, a return process may be performed to display the screen (that is, the screen of the predetermined website on the Internet) before the process at S2. In the present configuration, the control circuit 11 that performs the process at S4 corresponds to an example of an "operation control section". The control circuit 11 functions to perform at least either of a predetermined return operation or a predetermined power-saving operation after a predetermined code display release condition is met.

In the present configuration, even when the information code C is not displayed in a readable state on the display unit 12 (such as when the predetermined default screen or a display screen for an application program that does not involve display of the information code C is displayed, as in FIG. 4 and FIG. 5), the process in FIG. 9 is performed in parallel. Therefore, even when the information code C is not displayed on the display unit 12 as in FIG. 4 and FIG. 5, the display apparatus 10 proceeds to Yes at S1 in FIG. 9 when the direction detecting unit detects that the orientation of the display unit 12 is the "predetermined orientation". As shown in FIG. 8, the display state of the display unit 12 is switched to the state in which the information code C is displayed in a readable manner.

In addition, in the present configuration, the control circuit 11 that functions as the display control unit performs control to switch the display in the display unit 12 to a predetermined suppressed state when a predetermined suppression condition is met. Specifically, when a predetermined suppression condition is met (such as when a period over which the operating unit 13 is not operated reaches a certain amount of time or longer), the control circuit 11 performs control to turn OFF the backlight 12A of the display unit 12 or suppression control to suppress the irradiation of light from the backlight 12A of the display unit 12 to be lower than that at S2 (that in a predetermined irradiation state). During a period in which the process at S2 is not performed, power saving can be performed when the predetermined suppression condition is met.

Meanwhile, because the process in FIG. 9 is performed in parallel even in the "predetermined suppressed state" such as this, when the direction detecting unit detects that the orientation of the display unit 12 is the "predetermined orientation" while in the predetermined suppressed state, and the display apparatus 10 proceeds to Yes at S1, the "predetermined suppressed state" is terminated at S2. The display apparatus 10 displays the information code C in a readable state on the display unit 12 and maintains the display. Specifically, the display apparatus 10 maintains a state in which the information code C is clearly displayed by irradiating light from the backlight 12A of the display unit 12 in a predetermined irradiation state.

In the present configuration, when the above-described "predetermined suppression condition" is met (such as when a period over which the operating unit 13 is not operated reaches a certain amount of time or longer) during a period from when the display apparatus 10 proceeds to Yes at S1 until the display apparatus 10 proceeds to Yes at S3, the display apparatus 10 displays the information code C in a readable state on the display unit 12 and maintains this display of the information code C in a readable state, without switching the display in the display unit 12 to the above-described "predetermined suppressed state". That is, when the "predetermined suppression condition" is met when the direction detecting unit has detected that the orientation of the display unit 12 is the "predetermined orientation", the display apparatus 10 prioritizes the readable display of the information code C rather than the backlight-OFF control and the suppression control. The display apparatus 10 maintains the display of the information code C while light is irradiated from the backlight 12A in a predetermined irradiation state.

Examples of the Effects of the Present Configuration

In the present configuration, situations in which only an unreadable image or a difficult-to-read image is continuously displayed while the display unit 12 is being held towards the reading apparatus 20 that is in a predetermined arrangement (an arrangement that enables the reading apparatus 20 to recognize the image in the display unit 12 that is at a predetermined orientation) does not easily occur. Therefore, problems, such as reading delays and failures, resulting from such situations do not easily occur. For example, when the user performs a holding operation to hold the display 12 at a "predetermined orientation" to the reading apparatus 20 that is in the predetermined arrangement, the information code C is displayed in a predetermined readable state and the state is maintained in the display unit 12 that is being held over the reading apparatus 20. Therefore, the reading apparatus 20 can more accurately and quickly recognize the configuration of the information code C that is displayed on the display unit 12 being held over the reading apparatus 20.

In addition, the control circuit 11 that corresponds to the display control unit switches the display state of the display unit 12 to the state in which the information code C is displayed in a readable manner, when the direction detecting unit detects that the orientation of the display unit 12 is the predetermined orientation at least when the information code C is not being displayed in a readable state on the display unit 12 (such as when the information code is not being displayed at all, or when the information code cannot be read because of the information code being too dark, too small, or a portion thereof being missing).

As a result of this configuration, even when the information code C is not displayed in a readable state on the display unit 12, the display unit 12 can be forcibly switched to a "state in which the information code C is displayed in a readable state" by the orientation of the display unit 12 being changed to the "predetermined orientation". Therefore, even should the display unit 12 be in an unreadable state (such as displaying a screen on which the information code C is not present or a screen on which the information code C is in an unreadable state) immediately before reading, the user does not need to be forced to perform complicated operations to switch the screen. The burden placed on the user and delays in reading resulting from complicated operations can be more effectively reduced.

In addition, the control circuit 11 that corresponds to the display control unit switches the display state of the display unit 12 to the state in which the information code C is displayed in a readable state, when the direction detecting unit detects that the orientation of the display unit 12 is a predetermined orientation while a predetermined default screen (FIG. 4) or a display screen (FIG. 5) of an application program that does not involve display of the information code C is displayed on the display unit 12.

In the present embodiment, even should the default screen or the display screen of an application program that does not involve display of the information code C be displayed on the display unit 12 immediately before reading, the screen can be easily and quickly switched to the screen for enabling reading of the information code C (the screen on which the information code C is displayed in a readable state) by an operation in which the orientation of the display unit 12 is changed to the "predetermined orientation". Use of the above-described configuration is particularly useful when, for example, the display apparatus 10 is used in a manner in which the amount of time during which the default screen or the display screen of the an application program that does not involve display of the information code C is displayed is longer than the amount of time over which the information code C is displayed.

In addition, the control circuit 11 that corresponds to the display control unit performs control to switch the display on the display unit 12 to a "predetermined suppressed state" when a "predetermined suppression condition" is met. When the direction detecting unit detects that the orientation of the display unit 12 is the predetermined orientation while in the "predetermined suppressed state", the control circuit 11 terminates the "predetermined suppressed state". The control circuit 11 displays the information code 12 in a readable state on the display unit 12 and maintains this state. As a result of this configuration, the display in the display unit 12 can be switched to a suppressed state when the "predetermined suppression condition" is met. Power saving can be more easily achieved. Meanwhile, in a power saving configuration such as this, a problem occurs in that reading failure tends to occur when the reading operation is performed while in the suppressed state. However, in the present configuration, when the operation to hold the display unit 12 at the "predetermined orientation" is performed while in the suppressed state, the suppressed state is terminated. The information code C can be displayed in a readable state. Therefore, reading defects and the like resulting from the reading operation being performed while in the suppressed state do not easily occur.

Specifically, the readable state is a state in which at least light is irradiated from the backlight 12A of the display unit 12 in a predetermined irradiation state. The control circuit 11 that corresponds to the display control unit performs control to turn OFF the backlight 12A of the display unit 12 or suppression control to suppress the irradiation of light from the backlight 12A of the display unit 12 to be lower than that in the predetermined irradiation state, when the "predetermined suppression condition" is met. When the direction detecting unit detects that the orientation of the display unit 12 is the "predetermined orientation" while in the "predetermined suppressed state", the control circuit 11 terminates the "predetermined suppressed state".

The control circuit 11 maintains the state in which the information code C is displayed while irradiating light from the backlight 12A of the display unit 12 in the predetermined irradiation state. As a result of this configuration, when the "predetermined suppression condition" is met, backlight-OFF control or suppression control to reduce irradiation of light from the backlight 12A can be performed. Power consumption by the backlight 12A, of which power consumption is a concern, can be effectively reduced. Meanwhile, in a power saving configuration such as this, the reading operation may be performed in the state in which the backlight 12A is turned OFF or the irradiation from the backlight is reduced. A problem arises in that reading failure tends to occur. However, in the present configuration, when the operation to hold the display unit 12 at the "predetermined orientation" is performed while the backlight-OFF control or the suppression control is being performed, the backlight 12A can be returned to the predetermined irradiation state and the information code C can be displayed in a clear and readable state. Therefore, reading defects and the like resulting from the reading operation being performed during the backlight-OFF control or the suppression control do not easily occur.

In addition, when the predetermined suppression condition is met when the direction detecting unit detects that the orientation of the display unit 12 is the predetermined orientation, the display apparatus 10 displays the information code C in a readable state on the display unit 12 and maintains the display of the information code C in the readable state, without switching the display in the display unit 12 to the predetermined suppressed state.

In a power saving configuration such as the present configuration, the "predetermined suppression condition" may be met after the holding operation to hold the display unit 12 at the "predetermined orientation" is performed and the information code C is displayed in the readable state. In this case, display may be suppressed before the reading apparatus 20 completes reading. Reading failures tend to occur. In this regard, in the present configuration, when the "predetermined suppression condition" is met when the orientation of the display unit 12 is detected as being the "predetermined orientation", the information code C can be displayed in the readable state and maintained in this state without the display in the display unit 12 being switched to the "predetermined suppressed state". That is, the display unit 12 being forcibly switched to the "predetermined suppressed state" during the period over which the above-described holding operation (operation for holding the display unit 12 at the predetermined orientation) is being performed can be more easily prevented. Problems, such as reading failure, resulting from the display being suppressed before reading is completed can be more easily prevented.

More specifically, when the "predetermined suppression condition" is met while the orientation of the display unit 12 is detected as being the "predetermined orientation", the information code C can be displayed in a readable state and maintained in this state without the backlight-OFF control or suppression control being performed. That is, the backlight 12A being forcibly switched to the OFF state or the suppressed state during the period over which the above-described holding operation is performed can be more easily prevented. Reading failure resulting from the backlight 12A being suppressed before reading is completed can be more easily prevented.

In addition, in the present configuration, the three-axis sensor 15 and the control circuit 11 (direction detecting unit) are capable of detecting a state in which the display unit 12 is oriented vertically downward or vertically downward at an angle. When the direction detecting unit detects the state in which the display unit 12 is oriented vertically downward or vertically downward at an angle, the control circuit 11 that corresponds to the display control unit displays the information code C in a readable state on the display unit 12 and maintains the display of the information code C in a readable state. This configuration is advantageous when the display apparatus 10 is to be used such that the display unit 12 is held such as to be oriented downward or downward at an angle (such as when the reading apparatus 20 is arranged such as to be capable of recognizing the display of the display unit 12 when the display unit 12 is oriented downward or downward at an angle).

In particular, when the display apparatus 10 is used in a manner in which the display unit 12 is held such as to be oriented downward or downward at an angle in this way, the user cannot easily see the display unit 12 during reading. Therefore, when reading delay or failure occurs, a problem arises in that the user cannot easily identify whether the reading delay or failure has occurred as a result of display timing being off, or as a result of other factors. In the present configuration, delays and failures caused by at least the display timing being off can be reduced. Therefore, the above-described problem can be more easily handled.

In addition, in the present configuration, when the direction detecting unit detects that the orientation of the display unit 12 is the predetermined orientation, the control circuit 11 that corresponds to the display control unit fixes (maintains) the display state of the display unit 12 to a state in which the information code C is continuously displayed, for a certain amount of time. In this configuration, because the display of the information code C can be fixed (maintained) for a certain amount of time when the display 12 is oriented at the "predetermined orientation", a more stable code display can be performed. Reading delays and failures can be further reduced.

Furthermore, in the present configuration, when the direction detecting unit detects that the orientation of the display unit 12 is the "predetermined orientation", the control circuit 11 that corresponds to the display control unit controls the display unit 12 to be in a state in which the information code C is displayed in a readable state and the state in which the information code C is displayed in a readable state is maintained until a predetermined code display release condition is met. The operation control section that performs at least either of a predetermined return operation or a predetermined power saving operation after the predetermined code display release condition has been met is provided.

As a result of this configuration, when the display unit 12 is held at the predetermined orientation and reading is performed, the display of the information code C can be stabilized and reading can be facilitated during the period until the code display release condition is met. The return operation or the power saving operation can be smoothly performed after the code display release condition is met. Therefore, a problem in which unnecessary code display is unrestrictedly and excessively continued after reading has been completed does not easily occur. For example, in the configuration in which the return operation is performed after the code display release condition is met, unnecessary code display is terminated and the screen easily returns to the predetermined return screen after reading is completed. In addition, in the configuration in which the power saving operation is performed after the code display release condition is met, unnecessary code display is terminated and power consumption can be suppressed after reading is completed.

In addition, in the present configuration, when the display unit 12 is not at the predetermined orientation, such as oriented downward or downward at an angle, the information code is not displayed in a readable state on the display unit 12. Therefore, even if the display unit 12 is, for example, oriented upwards with the intention of performing unauthorized imaging of the information code using an apparatus other than the reading apparatus 20, the information code is not displayed on the display unit 12. Therefore, imaging of the information code for unauthorized purposes can be prevented.

Second Embodiment

Figure 10:
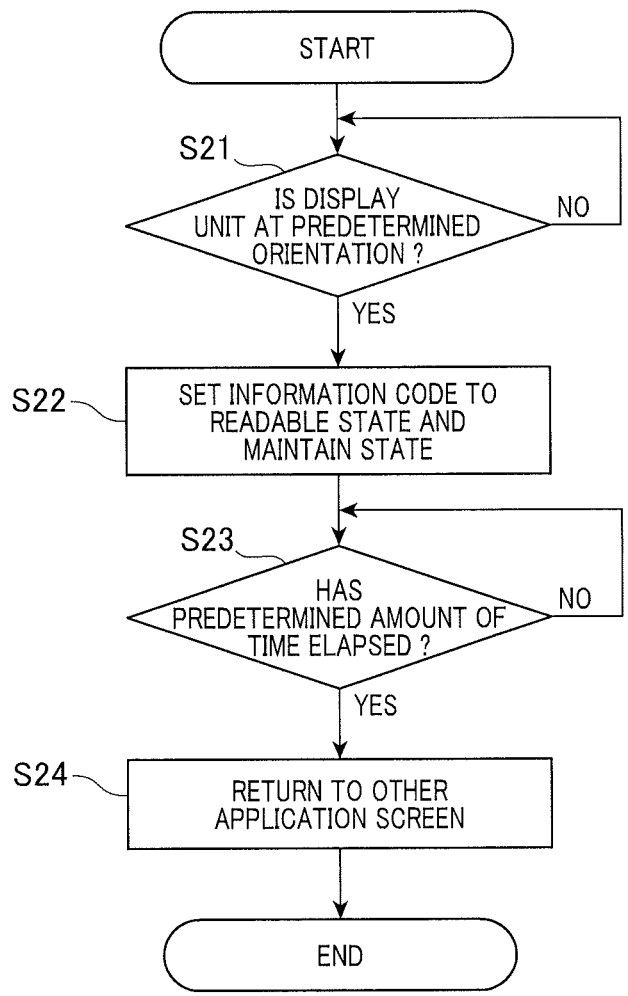
FIG. 10 is a flowchart of an example of the flow of a display process in the portable information code display apparatus according to a second embodiment.

A second embodiment differs from the first embodiment only in that the code display process in FIG. 9 is changed as in FIG. 10. The second embodiment is similar to the first embodiment in other aspects. In the process in FIG. 10, the processes at S21 to S23 are respectively the same as the processes at S1 to S3 in FIG. 9. Therefore, detailed descriptions of these processes are omitted.

In the process in FIG. 10, the process at S24 is performed instead of the process at S4 in FIG. 9. That is, after determining that a predetermined amount of time has elapsed at S23 (that is, after the information code C has been displayed over a predetermined amount of time in the readable state as in FIG. 8), in the process at S24, the display apparatus 10 performs a process to switch the display to a display screen for an application program. The display screen displayed in the process at S24 is, for example, the display screen of the application program displayed immediately before the process at S22 (that is, the process for displaying the information code C) is performed. As the application program, various publicly known application programs used in smartphones, tablet terminals, and the like can be used. For example, a browser is started as an application program before the process at S22, and a screen of a predetermined website on the Internet is displayed on the display unit 12. In this case, at S22, the display apparatus 10 performs the information code display. Then, after proceeding to Yes at S23, at S24, the display apparatus 10 may perform a return process to display the screen before the process at S22 (that is, the above-described screen of the predetermined website on the Internet).

Alternatively, one or a plurality of application programs, such as an application program for playing music, an application program for playing videos, an application program for settlement, or another application program, may be started as the application program before the process at S22, and the display screen of any of these application programs may be displayed. In this case, after displaying the information code at S22 and proceeding to Yes at S23, the display apparatus 10 may perform a return process to display once again the display screen of the application program (the screen of the application program displayed immediately before the process at S22). When a display screen of an application program is not displayed immediately before the process at S22, and a default screen such as that in FIG. 4 is displayed, the screen may be returned to the default screen such as that in FIG. 4 at S24.

Third Embodiment

Next, a third embodiment will be described. The hardware configuration of the display apparatus 10 according to the third embodiment is the same as that according to the first embodiment. Therefore, a detailed description of the hardware configuration will be omitted. According to the third embodiment, a display such as that shown in FIG. 11, for example, can be performed by any of the application programs present in the display apparatus 10.

Figure 11:
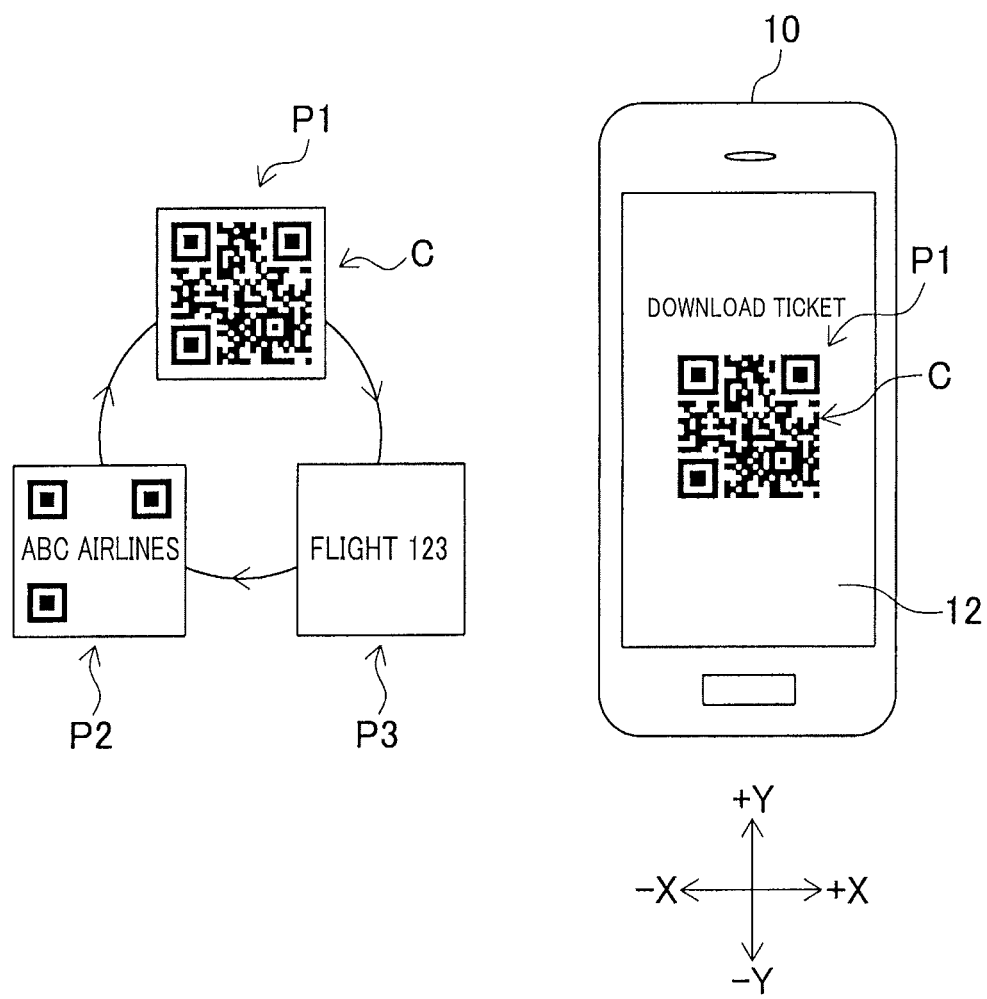
FIG. 11 is an explanatory diagram for conceptually explaining a portable information code display apparatus according to a third embodiment.

In this configuration, the user performs a predetermined operation on the operating unit 12 and starts a predetermined application program. As a result, an image display such as that in FIG. 11 is started. When the image display is started, a plurality of images are successively displayed on the display unit 12, as shown in the left-hand drawing in FIG. 11. For example, in the example in FIG. 11, an image P1 of the information code C, an image P2 including characters indicating the name of an airline company, and an image P3 including characters indicating a flight number of an airplane are alternatingly displayed on the display unit 12. Specifically, in a state in which the orientation of the display apparatus 10 is not the "predetermined orientation", the image P1, the image P2, and the image P3 are set to switch at a certain time interval (such as at a 0.2-second interval) in this order. For example, the image P1 of the information code C is displayed for a certain amount of time (such as 0.2 seconds).

Then, the image P1 of the information code C disappears and the image P2 including the characters indicating the name of an airline company is displayed for a certain amount of time (such as 0.2 seconds). After the image P2 has been displayed for the certain amount of time (such as 0.2 seconds), the image P2 disappears and the image P3 including the characters indicating the flight number of an airplane is displayed for a certain amount of time (such as 0.2 seconds). Then, after the image P3 has been displayed for the certain amount of time (such as 0.2 seconds), the image P3 disappears and the image P1 is again displayed.

In this way, after image display is started, the above-described switching display (display of each of the image P1, P2, and P3) continues. Meanwhile, in the display apparatus 10, in parallel with a switching display such as this, the orientation of the display apparatus 10 is continuously detected during the continuing switching display. The display apparatus 10 determines whether or not the direction in which the display unit 12 is oriented is the "predetermined orientation". This determination process is similar to the "process for determining whether or not the orientation of the display unit 12 is the 'predetermined orientation'" (that is, the determination process at S1) according to the first embodiment. That is, in this configuration as well, the display apparatus 10 determines whether or not the three-axis sensor 15 detects a state in which the display unit 12 is oriented vertically downward or vertically downward at an angle.

While the above-described switching display is being continued, when the orientation of the display unit 12 is detected as being the "predetermined orientation" (that is, a detection is made that the angle θ is 0° or greater and the predetermined threshold θa or less over the certain amount of time or longer), the display in the display unit 12 is switched to the image P1 (FIG. 11 and the like) of the information code C as in the right-hand drawing in FIG. 11. The display is fixed (maintained) for a certain amount of time in the state in which the image P1 of the information code C (a QR code (registered trademark) in the example in FIG. 11) is displayed. In this way, in the present configuration, when the display unit 12 is in the state of being oriented vertically downward or vertically downward at an angle by the user holding the display apparatus 10 over the reading apparatus 20 after the application program (an application program for performing switching display) is started, the angle θ becomes 0° or greater and the predetermined threshold θa or less over the certain amount of time or longer.

Therefore, the above-described switching display is interrupted, and only the image P1 of the information code C is continuously displayed. Meanwhile, during the period over which the orientation of the display unit 12 is not the "predetermined orientation" (that is, during the period over which the condition "the angle θ is 0° or greater and the predetermined threshold θa or less over the certain amount of time or longer" is not met) after the application program for performing switching display is started, the switching operation of the respective displays of the images P1, P2, and P3 is continued.

As described above, in the present configuration, the control circuit 11 that corresponds to the display control unit is capable of changing the display state of the display unit 12 to the display state in which the information code C is in a readable state and a state in which another drawing or another piece of information differing from the information code C is displayed. Specifically, the control circuit 11 performs the switching display operation in which the displays of the images P1, P2, and P3 are sequentially switched. As a result of a configuration in which the display in the display unit 12 can be changed to the "display state in which the information code C is in a readable state" and the "state in which another image or another piece of information differing from the information code C is displayed" in this way, various types of display modes that cannot be actualized in a configuration in which only the information code C is continuously displayed can be actualized.

However, when switching is merely performed between the display of the information code C and the display of another drawing or another piece of information, the other drawing or other piece of information (such as the image P2 or the image P3) may be displayed rather than the information code C when an attempt is made to read the information code C. In this case, a problem occurs in that reading is delayed until the information code C is again displayed in a readable manner. In this regard, in the present configuration, when the holding operation for enabling the information code C to be read is performed (that is, when the operation is performed to hold the display unit 12 at the "predetermined orientation"), the display of the image P1 is maintained (fixed) in a readable state. Because the information code C is maintained in a readable state, the information code C can be more quickly and reliably read. Therefore, the timing at which the display unit 12 is held at the predetermined orientation and the timing at which the information code C is actually read does not significantly differ. A long time lag from when the display unit 12 is oriented at the predetermined orientation until the reading result is acquired does not easily occur. Therefore, poor reading experience can be more effectively suppressed.

In the example in FIG. 11, an image of a QR code (registered trademark) that is linked with a boarding pass is shown as an example of the image P1 of the information code C. As images related to the information (information related to the boarding pass) recorded in the QR code, the image P2 that identifies the airline company of the airplane that can be boarded with the boarding pass and the image P3 that identifies the flight number of the airplane that can be boarded with the boarding pass are alternatingly displayed. As a result, during normal operation (when the display unit 12 is not oriented in a reference direction), the type of information code C can be understood by the other images P2 and P3 being viewed. The information code C can be appropriately read.

Variation Example According to the Third Embodiment

Next, a variation example according to the third embodiment will be described. The variation example according to the third embodiment differs from the above-described representative example according to the third embodiment only in terms of the specific example of the display process. The variation example according to the third embodiment is the same as the representative example according to the third embodiment in other aspects. Specifically, in the switching display process in the representative example, the images P1, P2, and P3 are alternatingly displayed in sequence as in FIG. 11. However, in the variation example, control is performed to display either the image P2 or the image P3, or both, and not the image P3 during the switching display process.

Figure 12:
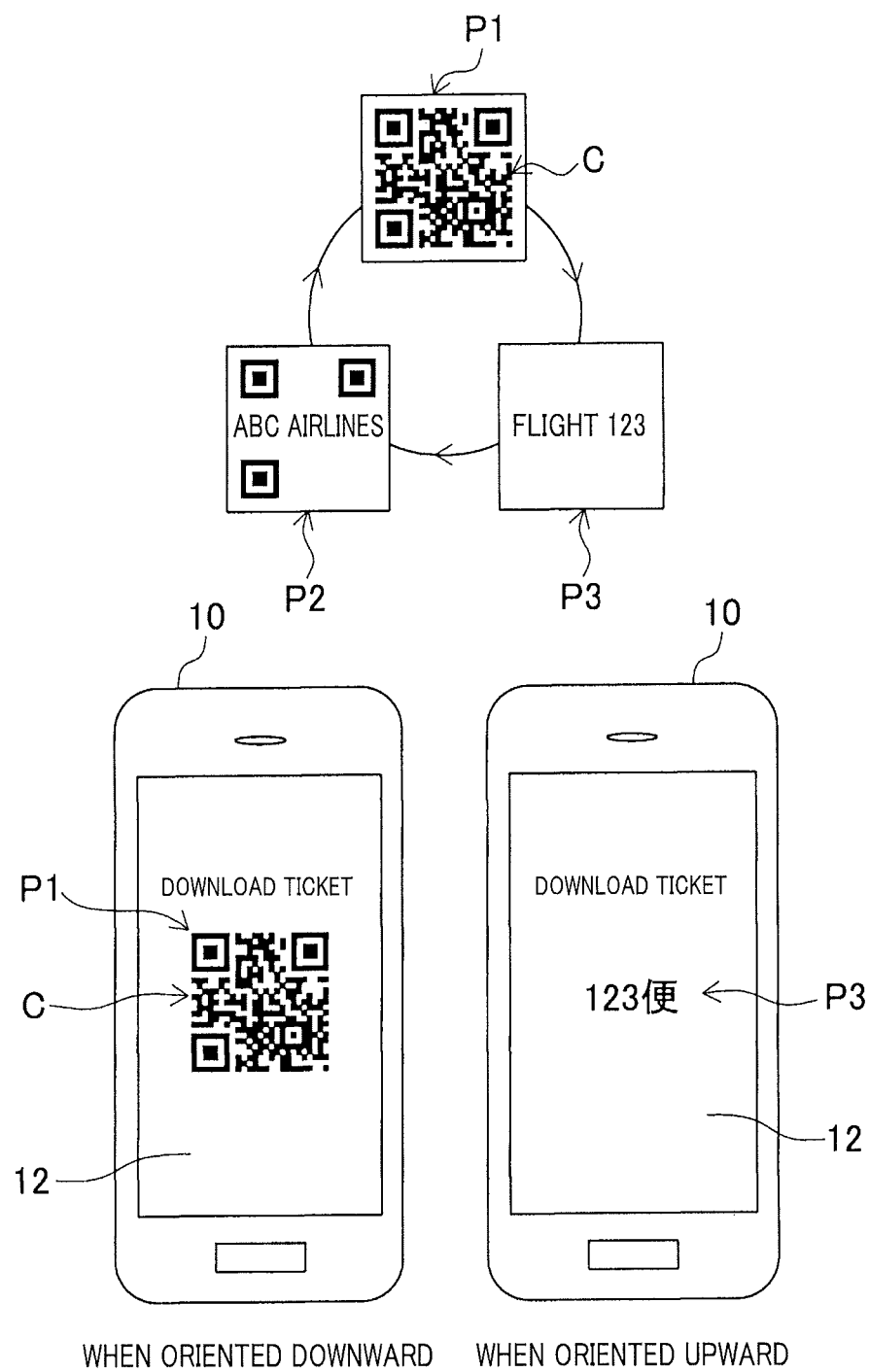
FIG. 12 is an explanatory diagram for conceptually explaining a display example in the portable information code display apparatus according to the third embodiment.

Various methods can be used for displaying the images P2 and P3 at this time. For example, only the image P2 may be continuously displayed until the orientation of the display unit 12 is detected as being the "predetermined orientation". Alternatively, only the image P3 may be continuously displayed until the orientation of the display unit 12 is detected as being the "predetermined orientation" (this example is shown on the right side of the lower drawings in FIG. 12). Alternatively, the image P2 and the image P3 may be displayed such as to be switched every certain amount of time, until the orientation of the display unit 12 is detected as being the "predetermined orientation". As a result, during the period over which the orientation of the display unit 12 is not the "predetermined orientation", an image other than the image of the information code C can be displayed. Geometric shapes and information other than the information code C can be more easily recognized by the user when the display unit 12 is not at the "predetermined orientation" (such as when the display unit 12 is oriented upward and easy to see).

In this configuration, the process for determining whether or not the orientation of the display unit 12 is the "predetermined orientation" is performed by a method similar to that at S1 (FIG. 9) according to the first embodiment, while an image other than the image of the information code C is being displayed. When the orientation of the display unit 12 is the "predetermined orientation", the information code C is displayed on the display unit 12 in a readable state, as on the left side in the lower drawings in FIG. 12. The information code C can be more easily read by the reading apparatus 20 or the like.

Fourth Embodiment

Next, a fourth embodiment will be described. The hardware configuration of the display apparatus 10 according to the fourth embodiment is the same as that according to the first embodiment. Therefore, a detailed description of the hardware configuration is omitted.

According to the third embodiment, an example of the configuration of the portable information code display apparatus 10 in which the information code C is displayed on the display unit 12 as part of still images that are switched described. However, in the present configuration, the information code C is displayed as part of a video. An example of the flow of the video is shown in FIG. 13A to FIG. 13F. In this example, the screen changes in the following order: FIG. 13A, FIG. 13B, FIG. 13C, FIG. 13D, FIG. 13E, and FIG. 13F. Display is performed such that an illustration within the code region of the information code C gradually changes. Specifically, a video display is performed in which a ball that appears from the left side of the code region, as in image P21 of FIG. 13A, moves as in image P22 of FIG. 13B and image P23 of FIG. 13C.

Figure 13C:
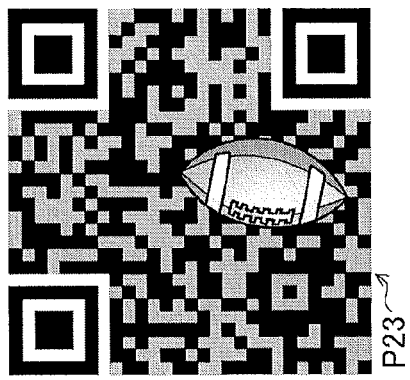
FIGS. 13A-13F are explanatory diagrams for conceptually explaining a display example of a video in the portable information code display apparatus according to a fourth embodiment.
Figure 13F:
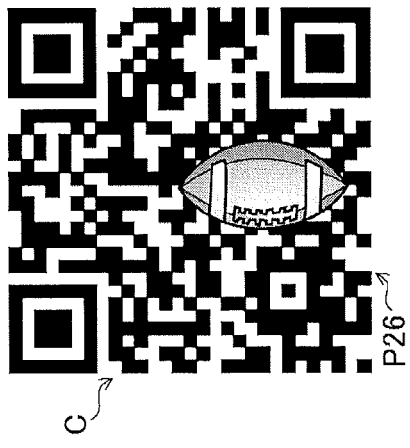
Figure 13B:
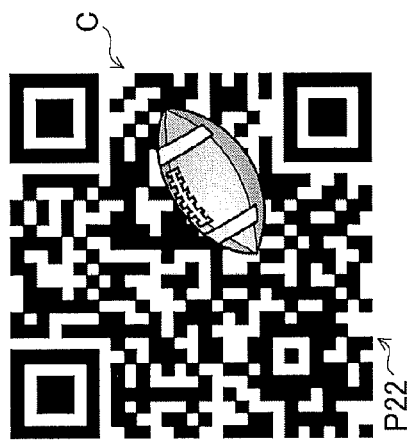
Figure 13E:
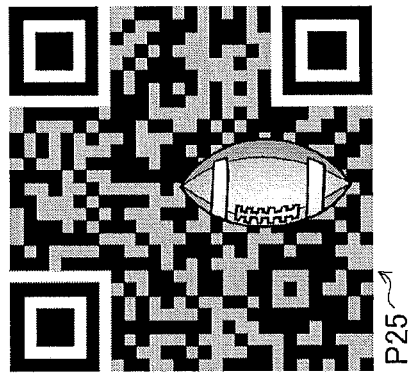
Figure 13A:
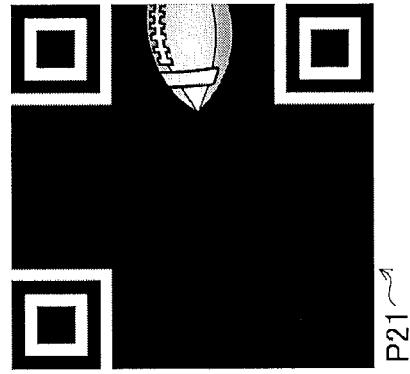
Figure 13D:
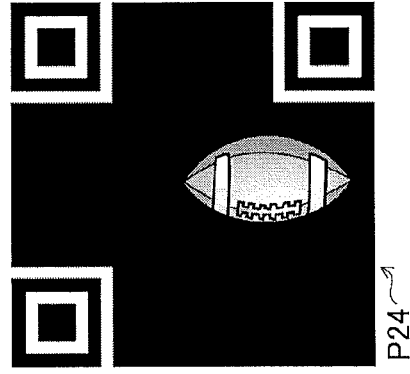

Then, a video display is performed in which the ball stops in a vertically standing state, as in image P24 of FIG. 13C, image P25 of FIG. 13D, and image P26 of FIG. 13E. In addition, regarding light colored cells and dark colored cells within the code region, excluding those in the vicinity of the three position detection patterns, a video display is performed in which the concentration of the light colored cells changes. That is, in the image P21 of FIG. 13A, the positions of the light colored cells are expressed in black. The concentration at these positions gradually decreases, and the light colored cells appear as in the image P23 of FIG. 13B. Furthermore, the concentration of the light colored cells gradually increases as in the image P23 of FIG. 13C. Thereafter, the positions of the light colored cells are expressed in black as in the image P24 of FIG. 13D. Then, the concentration of the light colored cells gradually decreases and the light colored cells appear as in the image P25 of FIG. 13E. Subsequently, the concentration of the light colored cells further gradually decreases and changes such that the light colored cells are expressed in white, as in the image P26 of FIG. 13F.

Because the video display is performed in this way, during the period over which the orientation of the display unit 12 is not detected as being the "predetermined orientation", the information code C is displayed such as to change between a readable state (the states in FIGS. 13B, 13C, 13E, and 13F) and an unreadable state (the states in FIGS. 13A and 13D). In the states in FIGS. 13B, 13C, 13E, and 13F, error correction by a publicly known error correction method can be performed regarding the position of the rugby ball. The data recorded in the code region by the light colored cells and the dark colored cells can be interpreted without difficulty.

While the video display such as this is being performed, the process for determining whether or not the orientation of the display unit 12 is the "predetermined orientation" is performed by a method similar to that at S2 according to the first embodiment. When the display unit 12 is determined to be at the predetermined orientation, the information code C is displayed such as to be readable by the reading apparatus 20. The display at this time may be, for example, an image of only the information code C being displayed in a fixed manner (maintained) as a continuous still image. The image of only the information code C is acquired by extraction of only the information code C that is displayed with the overlapping ball, as in FIGS. 13B, 13C, 13E and 13F. Alternatively, the image (an image in which the ball portion can be corrected by error correction and data can be interpreted) in any of FIGS. 13B, 13C, 13E and 13F may be displayed in a fixed manner (maintained) as a still image.

In this way, an image of only the information code C, or an image of the information code C in which a portion within the code region is expressed by an illustration, a symbol, or the like that can be error corrected is displayed for a certain amount of time. In this case, when the display unit 12 having a display screen such as this is held towards the reading apparatus during the certain amount of time, the reading apparatus 20 can read the information code C with certainty.

As described above, in the present configuration, the control circuit 11 that corresponds to the display control unit can change the display state of the display unit 12 between the "display state in which the information code C is in a readable state" and the "display state in which the inside of the code region of the information code C is unreadable". As a result of the configuration in which the display state is changed in this way, a dynamic display with high aesthetic quality and diverse variety that cannot be actualized by a configuration in which only the information code C is continuously displayed can be achieved.

However, when a dynamic display is merely performed, the information code C may be displayed in a state in which the inside of the code region is unreadable (such as the state in FIG. 13A or 13D) when an attempt is made to read the information code C. In this case, reading is delayed until the information code C is again displayed in a readable state. In this regard, in the present configuration, the video display is switched to a still image (a still image in which the information code C is displayed in a readable state) when the holding operation for reading the information code C is performed (that is, when the operation for holding the display unit 12 at the "predetermined orientation" is performed). The still image in which the information code C is displayed in a readable state is maintained. Therefore, the information code C can be more quickly and reliably read. As a result, the timing at which the display unit 12 is held at the "predetermined orientation" and the timing at which the information code C is actually read does not easily significantly differ. A long time lag from when the display unit 12 is oriented at the predetermined orientation until the reading result is acquired does not easily occur. Therefore, poor reading experience can be more effectively suppressed.

Fifth Embodiment

Figure 14:
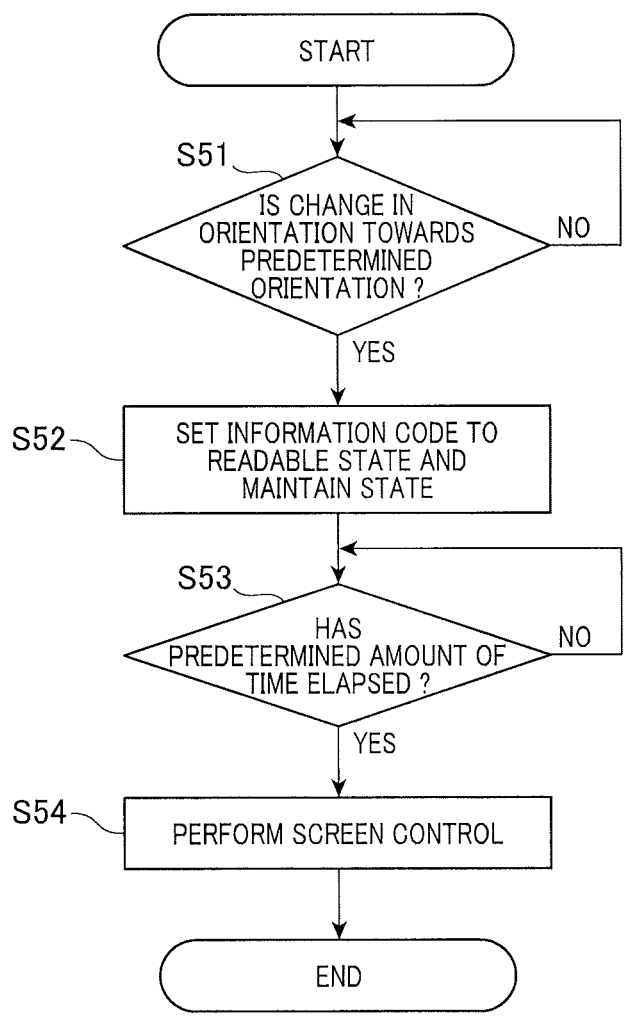
FIG. 14 is a flowchart of an example of the flow of a display process in a portable information code display apparatus according to a fifth embodiment.

A fifth embodiment differs from the first embodiment in that the code display process in FIG. 9 is changed as in FIG. 14. The fifth embodiment is similar to the first embodiment in other aspects. In the process in FIG. 14, the processes at S52 to S54 are respectively the same as the processes at S2 to S4 in FIG. 9. Therefore, detailed descriptions of these processes are omitted.

In this configuration as well, after the process in FIG. 14 is started, the three-axis sensor 15 continuously detects the respective accelerations αx, αy, and αz in the X-, Y-, and Z-axis directions, as in FIG. 6. The orientation of the acceleration αs that is applied to the display apparatus 10 can be continuously identified by the accelerations αx, αy, αz being combined. In addition, in this configuration as well, in the process at S51, which is performed every predetermined short amount of time, the display apparatus 10 determines the angle θ formed by the combined acceleration αs and the Z-axis positive direction at the time at which the process at S51 is performed.

The display apparatus 10 determines whether or not the angle θ is 0° or greater and the predetermined threshold θa or less over a certain amount of time (such as 0.1 seconds or 0.01 seconds) or longer. However, here, the threshold θa is set, for example, to 90°. The display apparatus 10 proceeds to Yes at S51 when the angle θ is 90° or less over the certain amount of time. In other words, in the present configuration, for example, a state in which the orientation (such as a direction within 10°) of the display unit 12 that is the vertically downward direction or an orientation at which the angle formed with the vertically downward direction is within a certain angle is the "predetermined orientation", and the angle θ is 90° or less continuously over the certain amount of time corresponds to "a predetermined state of change in which the orientation of the display unit 12 (display unit) detected by the direction detecting unit changes towards the 'predetermined orientation'".

In this way, in the present configuration, the control circuit 11 that corresponds to the display control unit recognizes the "predetermined state of change" in which the orientation of the display unit 12 detected by the direction detecting unit changes towards the "predetermined orientation". In this case, the control unit 11 displays the information code C in a readable state on the display unit 12 and maintains the display in the state in which the information code C is readable. In this configuration, the change towards the "predetermined orientation" is anticipated before the display unit 12 becomes completely oriented at the "predetermined orientation". The display of the information code C can be transitioned to the readable state at an early stage and stabilized. That is, the preparation for enabling the information code C to be read can be started before the display unit 12 is completely oriented at the "predetermined orientation". Reading of the information code C can be more easily completed at an early stage.

Variation Example According to the Fifth Embodiment

For example, the overall configuration of the representative example according to the fifth embodiment may be included, and a condition under which the display apparatus 10 to proceed to Yes in the determination process at S51 in FIG. 14 may be further added. Specifically, in addition to the condition under which the display apparatus 10 to proceed to Yes at S51 according to the fifth embodiment, for example, the display apparatus 10 may proceed to Yes at S51 "when a reduction amount Δθ of the angle θ during a predetermined short amount of time is a certain value or more".

When the display unit 12 is held stationary in a completely vertically downward-oriented state, the angle θ (the angle formed by the acceleration αs and the Z-axis positive direction) is 0°. Therefore, when the angle θ is rapidly decreasing and approaching 0°, the likelihood is high that an operation for setting the display unit 12 at the downward orientation is being performed. Here, after the process in FIG. 14 is started, the reduction amount Δθ of the angle θ is determined every predetermined short amount of time (such as every several milliseconds or every several tens of milliseconds). When the reduction amount Δθ is a certain value or more (such as 40° or more), the display apparatus 10 proceeds to Yes at S51. In a configuration such as this as well, the state of change towards the "predetermined orientation" can be anticipated before the display unit 12 (display unit) becomes completely oriented at the "predetermined orientation". The display of the information code C can be transitioned to the readable display state at an early stage and stabilized. Therefore, the preparation for enabling the information code C to be read can be made before the display unit 12 is completely oriented at the "predetermined orientation". Reading of the information code C can be more easily completed at an early stage. In this configuration as well, in a manner similar to that according to the first embodiment, the "orientation of the display unit 12 at which the angle θ is 0° or greater and the predetermined threshold ea or less" is the "predetermined orientation".

A condition under which the display apparatus 10 to proceed to Yes in the determination process at S51 in FIG. 14 is added herein. However, the above-described determination process (the determination process in which the display apparatus 10 proceeds to Yes at S51 when the reduction amount Δθ of the angle θ during a short amount of time is a certain value or less, and proceeds to No when determined otherwise) may be performed instead of the determination process at S51 in the representative example according to the fifth embodiment.

Sixth Embodiment

Figure 15:
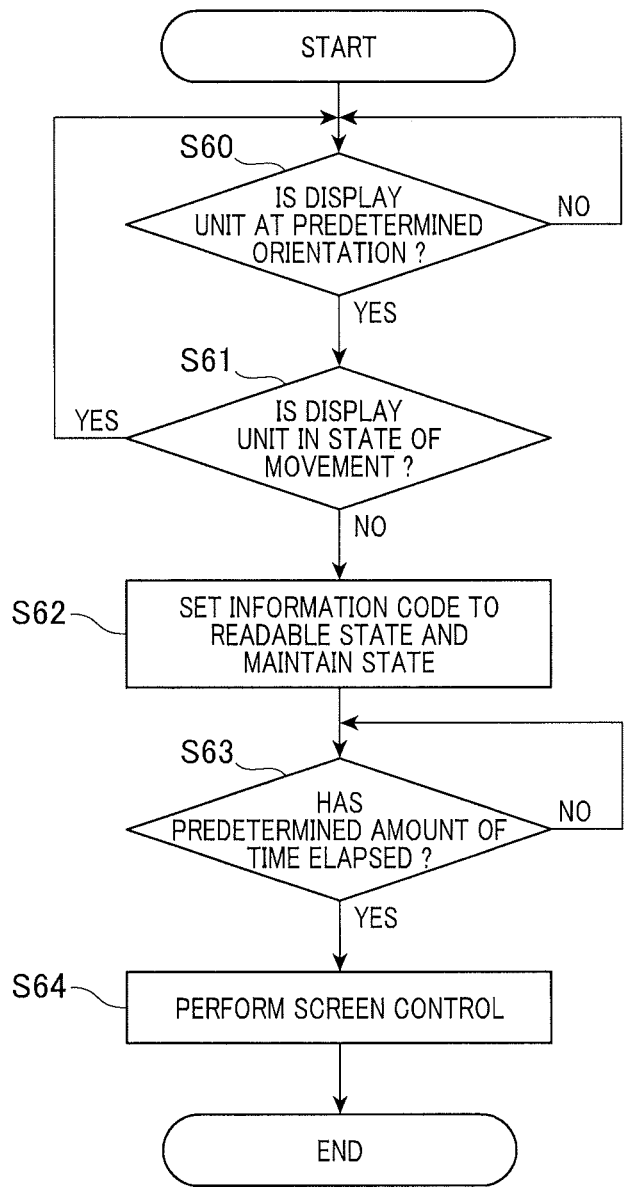
FIG. 15 is a flowchart of an example of the flow of a display process in a portable information code display apparatus according to a sixth embodiment.

A sixth embodiment differs from the first embodiment in that the code display process in FIG. 9 is changed as in FIG. 15. The sixth embodiment is similar to the first embodiment in other aspects. In the process in FIG. 15, the processes at S60 and S62 to S64 are respectively the same as the processes at S1 to S4 in FIG. 9. Therefore, detailed descriptions of these processes are omitted.

In this example, when the display apparatus 10 proceeds to Yes after a determination process similar to that at S1 in FIG. 9 is performed at S60 in FIG. 15 (that is, when the orientation of the display unit 12 is detected as being the "predetermined orientation"), the display apparatus 10 performs a determination process at S61. In the process at S61, whether or not the display apparatus 10 is in a "predetermined state of movement" (specifically, for example, whether or not change in acceleration in any of the X-axis direction, Y-axis direction, and Z-axis direction exceeds a certain value) is determined.

When determined that the change in acceleration in any of the X-axis direction, Y-axis direction, and Z-axis direction exceeds a certain value, the display apparatus 10 proceeds to Yes at S61. During this period, control to display the information code C in a readable state is not performed. Meanwhile, when the display apparatus 10 proceeds to Yes at S60 (when the orientation of the display unit 12 is detected as being the "predetermined orientation") and is not in the "predetermined state of movement" (for example, the change in acceleration in any of the X-axis direction, Y-axis direction, and Z-axis direction does not exceed a certain value), the display apparatus 10 proceeds to No at S61 and performs processes at S62 and subsequent steps.

In the present configuration, "when a predetermined permission condition under which display of the information code C is permitted is met", and "when the direction detecting unit detects that the orientation of the display unit 12 is the predetermined orientation", the control circuit 11 that corresponds to the display control unit displays the information code C in a readable state on the display unit 12, and maintains the display in a state in which the information code is readable. Specifically, even "when the direction detecting unit detects that the orientation of the display unit 12 is the predetermined orientation", if the display apparatus 10 is in the "predetermined state of movement", control to display the information code C in a readable state is not performed. The information code C is displayed in a readable state only when the display apparatus 10 is not in the "predetermined state of movement".

When the information code C displayed on the display unit 12 is to be read, the likelihood is high that the display apparatus 10 is placed in a stationary state or a similar state. Conversely, when the display apparatus 10 is in a state of movement, the likelihood is high that reading is not being attempted, even when the display unit 12 is at the "predetermined orientation". Therefore, control to display the information code C in a readable state is not performed when the display apparatus 10 is in the "predetermined state of movement". As a result, the information code C being pointlessly displayed in a readable state during an unnecessary period can be more easily suppressed.

Here, "the display apparatus 10 is not in a predetermined state of movement" is given as an example of the "predetermined permission condition". However, the "predetermined permission condition" is not limited to this example. For example, a setting being made in the display apparatus 10 to permit automatic display of the information code may be the "predetermined permission condition". Alternatively, the presence of the information code C to be displayed in the display apparatus 10 may be the "predetermined permission condition".

Seventh Embodiment

A seventh embodiment includes the overall features according to the first embodiment and differs only in terms of the manner in which the information code C is displayed. Therefore, detailed description of content that is the same as that according to the first embodiment is omitted. Features that have been added to the configuration according to the first embodiment will mainly be described. The concept according to the seventh embodiment can be applied to any of the other embodiments as well.

According to the seventh embodiment, when the information code C is displayed in a readable state in the process at S2 in FIG. 9, the control circuit 11 that corresponds to the display control unit displays an image that has been corrected based on an angle γ formed by a reference direction that serves as reference for the "predetermined orientation" and the direction in which the display unit 12 is oriented (the Z-axis direction shown in FIG. 6). Here, the reference direction that serves as reference for the "predetermined orientation" is the "vertical direction". The absolute value of the angle y formed by the reference direction and the direction in which the display unit 12 is oriented (the Z-axis direction shown in FIG. 6) is the same as that of an angle γ1 formed by a horizontal plane F and a display surface 12' of the display unit 12, shown in FIG. 16.

Figure 16:
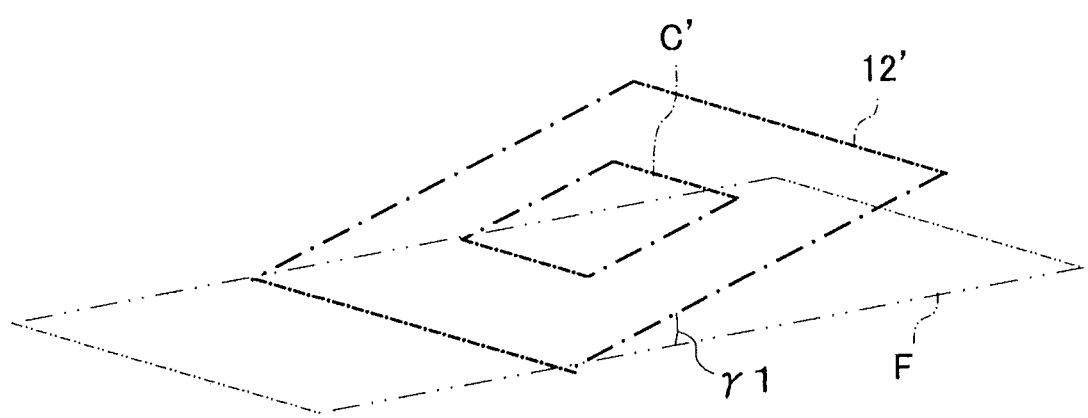
FIG. 16 is an explanatory diagram for explaining the concept of tilt angle in a portable information code display apparatus according to a seventh embodiment.
Figure 17A:
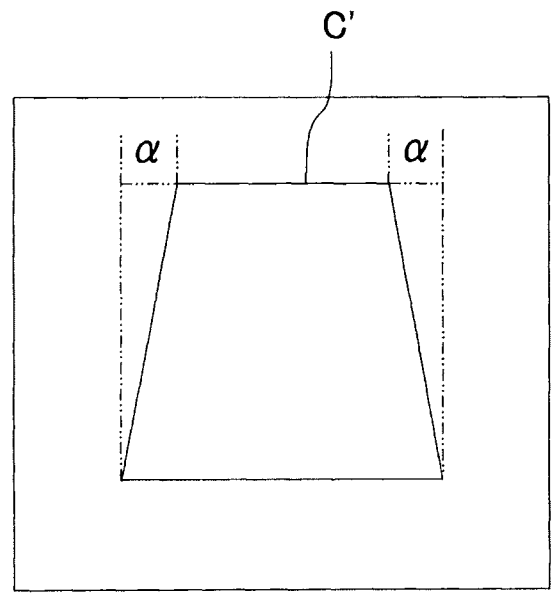
FIG. 17A is an explanatory diagram for conceptually explaining a code contour in a captured image when an image is captured of an information code that is displayed on a tilted display surface.

As shown in FIG. 16, when the display surface 12' of the display unit 12 tilts in relation to the horizontal plane F, a contour C' of the code image of the information code C becomes trapezoidal in the captured image by the reading apparatus 20, as shown in FIG. 17A. The length of the top side in relation to the length of the bottom side decreases as the angle γ1 increases. In a tilted state in which the lower portion of the display unit 12 is closer to the reading apparatus 20 than the upper portion, the angle γ1 is a negative value. In this case as well, the length of the top side in relation to the length of the bottom side decreases as the angle γ1 increases (in other words, as the angle γ1 becomes closer to 0°).

Figure 17B:
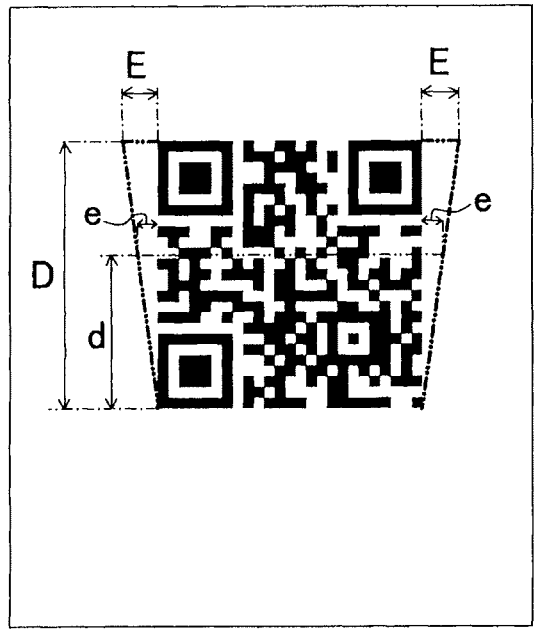
FIG. 17B is an explanatory diagram for explaining the concept of corrected display.

When tilting occurs, the code image C' becomes trapezoidal in this way. Therefore, in the present configuration, the information code C is displayed in a shape that has been corrected in advance. Specifically, an expansion amount E of the top side, shown in FIG. 17B, is determined based on the angle γ1. The expansion amount E is a negative value (that is, a value indicating a reduction amount) when the angle γ1 is negative. As a method for determining the expansion amount E as the angle γ1 increases, the value of the expansion amount E based on the value of the angle γ1 may be determined in advance and stored in the apparatus as table data. Alternatively, a calculation formula in which the expansion amount E increases as the angle γ1 increases may be used.

In this way, the expansion amount E of the top side is determined when the angle γ1 is determined. Based on the expansion amount E, the expansion amount per distance from the bottom side can be determined. For example, when the expansion amount at position d is e, the expansion amount is determined by an expression $e=(E \times d)/D$. When the angle γ1 is positive, a trapezoidal code image is generated in which the upper side expands with a larger expansion amount e, as the position increases in distance from the bottom side (as the position becomes closer to the top side). The generated code image is displayed in the process at S2 in FIG. 9. When the angle γ1 is negative, a trapezoidal code image is generated in which the upper side is reduced with a larger reduction amount e, as the position increases in distance from the bottom side (as the position becomes closer to the top side). The generated code image is displayed in the process at S2 in FIG. 9.

In the present configuration, when the information code C is displayed in a readable state, the information code C is displayed in a state in which correction is performed based on the angle formed by the reference direction and the direction in which the display unit 12 is oriented (specifically, a code image that is corrected to a trapezoidal shape matching the tilt angle γ1 is displayed on the display apparatus 10). As a result, the code image is recognized as being a shape that is closer to a square or a rectangle by the reading apparatus 20. The information code C can be more easily read in an image state that matches the tilt in relation to the reference direction.

Eighth Embodiment

Figure 18:
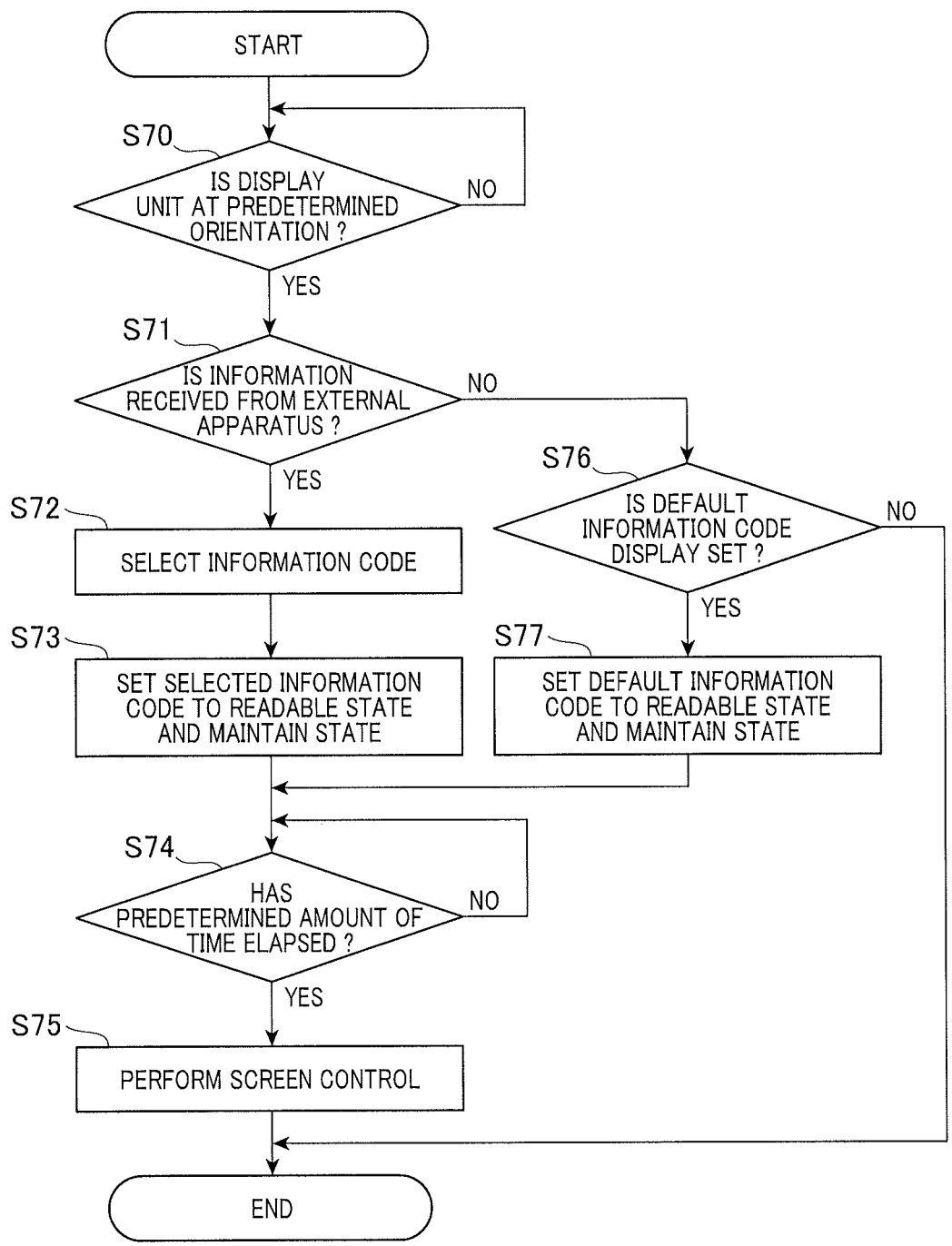
FIG. 18 is a flowchart of an example of the flow of a display process in a portable information code display apparatus according to an eighth embodiment.
Figure 19:
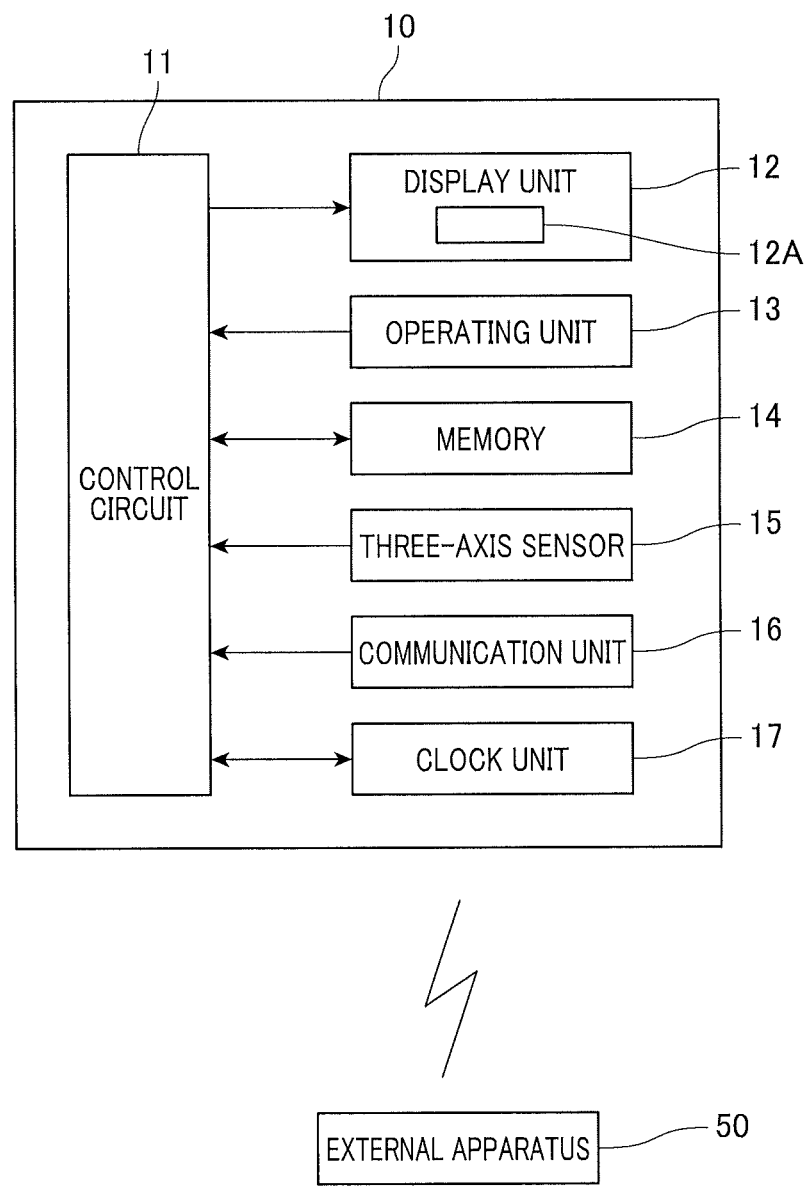

An eight embodiment differs from the first embodiment in that the code display process in FIG. 9 is changed as in FIG. 18. The eighth embodiment is similar to the first embodiment in other aspects. In particular, according to the present embodiment, any single information code among a plurality of types of information codes is set as a selected information code C and displayed in a readable state on the display unit 12. The plurality of types of information codes are stored in advance in the memory 14 that functions as a storage unit. A single information code among the plurality of information codes stored in the memory 14 is selected and displayed based on communication with an external apparatus 50 (see FIG. 19) via the communication unit 16. That is, according to the present embodiment, the display apparatus 10 automatically selects an appropriate information code based on information received from the external apparatus 50 and displays the selected information code on the display unit 12.

The external apparatus 50 wirelessly transmits information related to the environment and the like of a store or the like in which the reading apparatus 20 is set. Therefore, for example, when the display apparatus 10 is receiving information related to a store A from the external apparatus 50 that is set in the store A, the display apparatus 10 selects an information code that is to be displayed at the store A, among the plurality of types of information codes. In addition, for example, when the display apparatus 10 is receiving information related to a store B from the external apparatus 50 that is set in the store B, the display apparatus 10 selects an information code that is to be displayed at the store B, among the plurality of types of information codes. Information indicating the relationship between the information received from the external apparatus 50 and the information code to be displayed is stored in the memory 14 in advance. In addition, the display apparatus 10 may be capable of wireless communication directly with the external apparatus 50, or may be capable of wireless communication with the external apparatus 50 via an access point or the like.

The code display process according to the present embodiment will be described hereafter with reference to the flowchart in FIG. 18. In the process in FIG. 18, the processes at S70, S74, and S75 are respectively the same as the processes at S1, S3, and S4 in FIG. 9. Therefore, detailed descriptions of these processes are omitted.

When the display apparatus 10 proceeds to Yes after performing a determination process similar to that at S1 in FIG. 9 at S70 in FIG. 18 (that is, when the orientation of the display unit 12 is detected as being the "predetermined orientation"), the display apparatus 10 determines whether or not information from the external apparatus 50 is being received via the communication unit 16 (S71).

When determined that the information from the external apparatus 50 is being received via the communication unit 16, the display apparatus 10 proceeds to Yes at S71. The display apparatus 10 selects a single information code among the plurality of types of information codes stored in the memory 14, based on the information received at S71 (S72). When the information code to be displayed is selected in this way, at S73, the display apparatus 10 switches the display in the display unit 12 to an image of the selected information code C. The display apparatus 10 sets the display to a readable state in the state in which the image of the information code C is displayed, and maintains (fixes) the state.

For example, in a case in which the information code is to be held over the reading apparatus 20 that is set in the store A, when information is received from the external apparatus 50 that is set in the store A, the display apparatus 10 switches to the image of the information code to be displayed in the store A based on the information. The display apparatus 10 sets the display to a readable state in the state in which the image of the information code is displayed, and maintains (fixes) the state.

Meanwhile, when determined that information from the external apparatus 50 is not received after proceeding to Yes at S70, the display apparatus 10 proceeds to No at S71. The display apparatus 10 determines whether or not display of a default information code is set (S76). When the display of a default information code is set in advance, the display apparatus 10 proceeds to Yes at S76. The display apparatus 10 switches the display in the display unit 12 to the image of the default information code set in advance. The display apparatus 10 sets the display to a readable state in the state in which the image of the information code is displayed, and maintains (fixes) the state (S77). The default information code is stored in the memory 14 in advance, together with the above-described plurality of types of information codes. Meanwhile, when determined that the display of a default information code is not set, the display apparatus 10 proceeds to No at S76 and ends the present code display process without displaying an information code on the display unit 12 in a readable state.

As described above, in the present configuration, the memory (storage unit) 14 and the communication unit 16 are provided. The memory 14 stores therein a plurality of types of information codes that can be displayed on the display unit 12. The communication unit 16 is capable of communicating with the external apparatus 50. When the information code is displayed in a readable state, the control circuit 11 that corresponds to a display control unit selects and displays a single information code among the plurality of types of information codes stored in the memory 14, based on communication with the external apparatus 50 via the communication unit 16.

In this configuration, a single information code is selected from among the plurality of types of information codes and displayed, based on communication with the external apparatus 50 via the communication unit 16. Therefore, even when a plurality of types of information codes that can be displayed are present, the information code to be displayed can be automatically selected. Therefore, as a result of the information received by the display apparatus 10 from the external apparatus 50 being changed depending on the environment and the like in which the reading apparatus 20 is set, an appropriate information code can be automatically selected from among the plurality of types of information codes and displayed.

Ninth Embodiment

A ninth embodiment differs from the first embodiment in that the code display process in FIG. 9 is changed as in FIG. 20. The ninth embodiment is similar to the first embodiment in other aspects. In particular, according to the present embodiment, in a manner similar to that according to the eighth embodiment, a plurality of types of information codes are stored in advance in the memory 14 that functions as a storage unit. A single information code is selected from among the plurality of types of information codes stored in the memory 14 and displayed, based on the detected direction in which the display unit 12 is oriented. That is, according to the present embodiment, an appropriate information code is automatically selected and displayed on the display unit 12, depending on the change in position (change in tilt) of the display apparatus 10 on which the holding operation is performed.

According to the present embodiment, in a manner similar to that according to the above-described first embodiment, the angle θ formed by the combined acceleration αs and the Z-axis positive direction is a "value indicating the direction in which the display unit 12 is oriented". The "direction in which the display unit 12 is oriented when the angle θ becomes 0° or greater and the predetermined threshold θa or less" is the "predetermined orientation". In particular, according to the present embodiment, a threshold θm that is greater than 0° and less than the threshold θa is set in advance. The "direction in which the display unit 12 is oriented when the angle θ becomes 0° or greater and less than the threshold θm" is a "first orientation D1". When the first orientation D1 is detected, an information code C1 corresponding to the first direction D1 is selected from among the plurality of types of information codes and displayed.

In addition, the "direction in which the display unit 12 is oriented when the angle θ becomes θm or greater and the threshold θa or less" is a "second orientation D2". When the second orientation D2 is detected, an information code C2 corresponding to the second orientation D2 is selected from among the plurality of types of information codes and displayed. Therefore, according to the present embodiment, two information codes, the information code C1 and the information C2, are stored in advance in the memory 14 as the plurality of types of information codes.

Figure 21A:
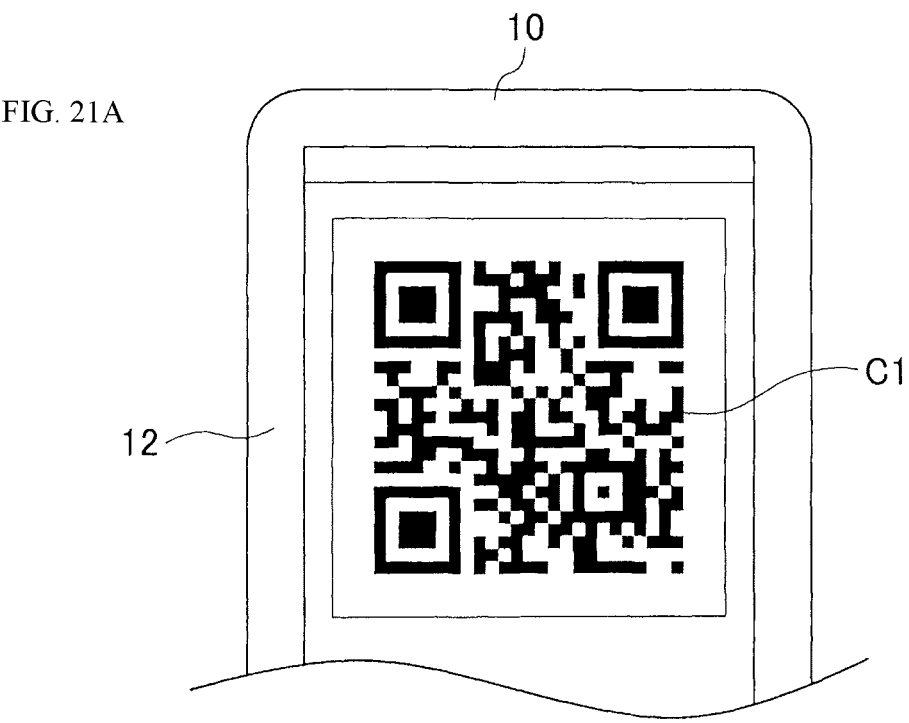
FIG. 21A is an explanatory diagram of a display example of an information code displayed in a display unit when the direction in which the display unit is oriented is a first orientation.
Figure 21B:
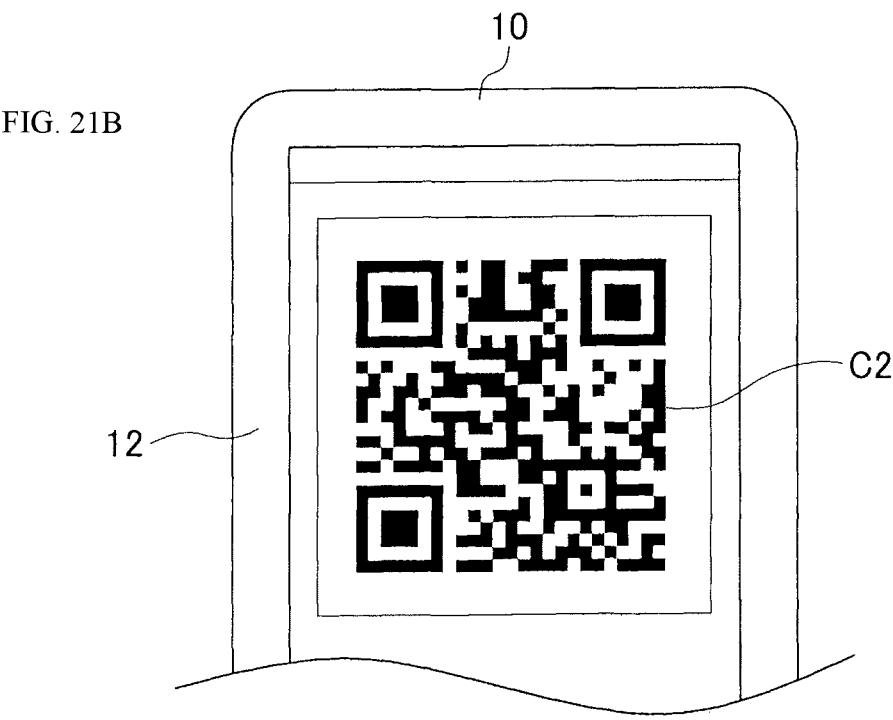
FIG. 21B is an explanatory diagram of a display example of an information code displayed in a display unit when the direction in which the display unit is oriented is a second orientation.
Figure 22:
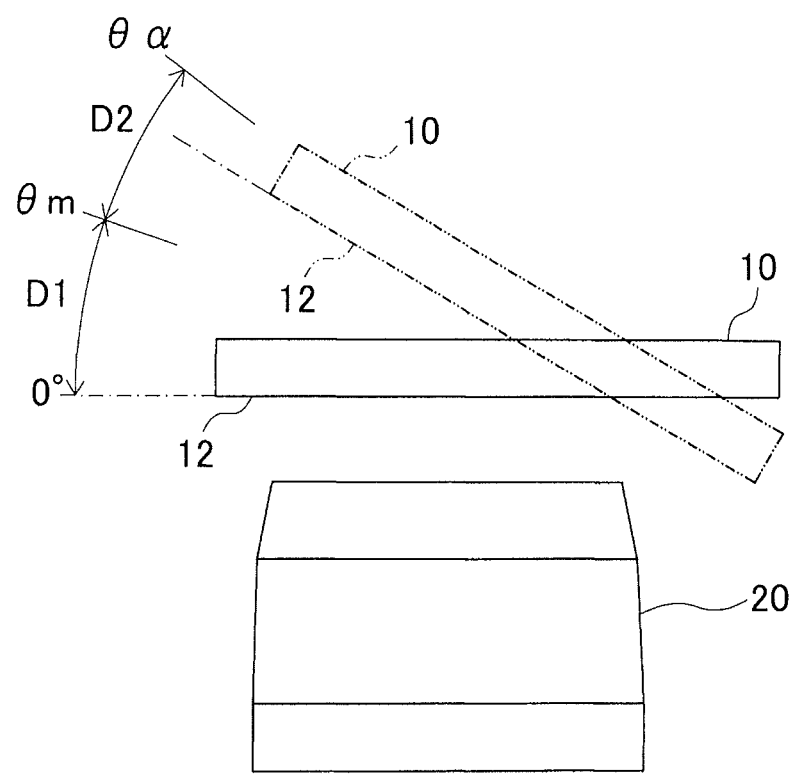
FIG. 22 is an explanatory diagram for explaining a state in which the direction in which a display unit is oriented in relation to an information code reading apparatus is changed.

When the first orientation D1 is detected, the information code C1 is displayed on the display unit 12 as shown in the example in FIG. 21A. When the second orientation D2 is detected, the information code C2 is displayed on the display unit 12 as shown in the example in FIG. 21B. As a result of the angle θ formed by the combined acceleration αs and the Z-axis positive direction being the tilt angle of the display apparatus 10 in relation to the horizontal plane, the relationship among the angle θ, the first orientation D1, and the second orientation D2 can be illustrated as shown in the example in FIG. 22. In FIG. 22, an example of the change in position (change in tilt) of the display apparatus 10 when the first orientation D1 is detected is indicated by the solid lines. An example of the change in position (change in tilt) of the display apparatus 10 when the second orientation D2 is detected is indicated by the two-dot chain lines.

The code display process according to the present embodiment will be described hereafter with reference to the flowchart in FIG. 20. In the process in FIG. 20, the processes at S80, S83, and S84 are respectively the same as the processes at S1, S3, and S4 in FIG. 9. Therefore, detailed descriptions of these processes are omitted.

When the display apparatus 10 proceeds to Yes after performing a determination process similar to that at S1 in FIG. 9 at S80 in FIG. 20 (that is, when the orientation of the display unit 12 is detected as being the "predetermined orientation"), the display apparatus 10 selects a single information code from among the plurality of information codes stored in the memory 14, based on the detected direction in which the display unit 12 is oriented (S81). When the information code to be displayed is selected in this way, at S82, the display apparatus 10 switches the display in the display unit 12 to the image of the selected information code C. The display apparatus 10 sets the display to a readable state in the state in which the image of the information code C is displayed and maintains (fixes) the state. For example, when the first orientation D1 is detected, the display apparatus 10 switches to the image of the information code C1 based on the orientation. The display apparatus 10 sets the display to a readable state in the state in which the image of the information code C1 is displayed and maintains (fixes) the state (see FIG. 21A).

As described above, in the present configuration, the memory (storage unit) 14 is provided. The memory 14 stores therein a plurality of types of information codes that can be displayed on the display unit 12. When the information code is displayed in a readable state, the control circuit 11 that corresponds to the display control unit selects a single information code from among the plurality of types of information codes stored in the memory 14, based on the direction in which the display unit 12 is oriented that has been detected by the direction detecting unit, and displays the selected information code.

In this configuration, a single information code is selected from among the plurality of types of information codes, based on the direction in which the display unit 12 is oriented that has been detected by the direction detecting unit, and displayed. Therefore, even when a plurality of types of information codes that can be displayed are present, the information code to be displayed can be automatically selected. Therefore, as a result of the user performing an operation to hold the display apparatus 10 over the reading apparatus 20 such that the direction in which the display unit 12 is oriented corresponds to the information code to be displayed, the desired information code can be automatically selected from among the plurality of types of information codes and displayed.

According to the present embodiment, the division of the predetermined orientation is not limited to two divisions, the first orientation S1 and the second orientation D2. The predetermined orientation may be divided based on the number of types of information codes stored in the memory 14. For example, when three types of information codes are stored in the memory 14, the predetermined orientation may be divided into three orientations. As a result, the desired information code can be automatically selected from among the three types of information codes and displayed.

Tenth Embodiment

A tenth embodiment differs from the first embodiment in that the code display process in FIG. 9 is changed as in FIG.

23. The tenth embodiment is similar to the first embodiment in other aspects. In particular, according to the present embodiment, an operation (also referred to, hereafter, as a permission operation) that is performed on the operating unit 13 when the information code is permitted to be displayed in a readable state on the display unit 12 is set. Therefore, even when the orientation of the display unit 12 is detected as being the predetermined orientation, the information code is not displayed in a readable state unless the user intentionally performs the permission operation on the operating unit 13.

Here, the permission operation may be set to be an operation in which a predetermined switch, among a plurality of switches configuring the operating unit 13, is operated. Alternatively, the permission operation may be set to be an operation in which a plurality of predetermined switches are simultaneously operated. In addition, when a portion of the operating unit 13 is configured by a touch panel, the permission operation may be set to be a touch operation performed at a predetermined position on the touch panel screen.

The code display process according to the present embodiment will be described hereafter with reference to the flowchart in FIG. 23. In the process in FIG. 23, the processes at S90 and S92 to S94 are respectively the same as the processes at S1 to S4 in FIG. 9. Therefore, detailed descriptions of these processes are omitted.

When the display apparatus 10 proceeds to Yes after performing a determination process similar to that at S1 in FIG. 9 at S90 in FIG. 23 (that is, when the orientation of the display unit 12 is detected as being the "predetermined orientation"), the display apparatus 10 performs a determination process at S91. In the process at S91, the display apparatus 10 determines whether or not the above-described permission operation is performed on the operating unit 13. When determined that the permission operation is performed on the operating unit 13 at S91, the display apparatus 10 proceeds to No at S91.

During this period, the display apparatus 10 does not perform control to display the information code C in a readable state. That is, during this period, the display of the information code in a readable state on the display unit 12 is prohibited. Meanwhile, when the display apparatus 10 proceeds to Yes at S91 (when the orientation of the display unit 12 is detected as being the "predetermined orientation") and the permission operation is determined to be performed on the operating unit 13, the display apparatus 10 proceeds to Yes at S91 and performs the processes at S92 and subsequent steps. In particular, according to the present embodiment, in the process at S92, the display apparatus 10 sets the display to a readable state in the state in which the image of the information code selected by the permission operation is displayed and maintains (fixes) the state. When only one information code to be displayed is present, the information code is set as the information code selected by the permission operation.

As described above, in the present configuration, the operating unit 13 is provided. The permission operation is performed on the operating unit 13 when the display of an information code is permitted. The control circuit 11 that corresponds to the display control unit prohibits the display of an information code when the permission operation is not performed on the operating unit 13. When the permission operation is performed on the operating unit 13 and the orientation of the display unit 12 is detected as being the predetermined orientation, the control circuit 11 displays at least the information code in a predetermined readable state on the display unit 12, and maintains the display in which the information code is in the readable state.

In this configuration, even when the direction detecting unit detects that the orientation of the display unit 12 is the predetermined orientation, the information code is not displayed in the readable state unless the user intentionally performs the permission operation on the operating unit 12. As a result, unintentional display of the information code is prevented. Security related to information code display can be enhanced.

The display apparatus 10 is not limited to displaying a single type of information code based on a permission operation, under the presumption that the display apparatus 1 proceeds to Yes at S90. A plurality of permission operations may be set. A single information code from among a plurality of types of information codes may be selected based on the permission operation and displayed. For example, under a presumption that the display apparatus 10 proceeds to Yes at S90, the information code C1 can be displayed in a readable state when a permission operation is performed in which a button A of the operating unit 13 is operated. The information code C2 can be displayed in a readable state when a permission operation is performed in which a button B of the operating unit 13 is operated. Furthermore, under a presumption that the display apparatus 10 proceeds to Yes at S90, an information code other than the information code C1 and the information code C2 can be displayed when a permission operation is performed in which the button A and the button B are simultaneously operated.

Other Embodiments

The present invention is not limited to the embodiments described in the descriptions above and the drawings. For example, the following embodiments are also included within the technical scope of the present invention.

According to the third embodiment, an example is given in which the image P1 of the information code C, and an image (images P2 and P3) of another drawing or another piece of information related to the information code C are alternatingly displayed. However, the present invention is not limited to this example. For example, when a product name, the name of a product provider (such as the company providing the product), an address of a website operated by the product provider, or the like is recorded in the information code C, the image of the information code C, and information or a graphic form (such as an image of the product itself, information on the product name, or a trademark of the product) of the product identified by the data recorded in the information code C may be alternatingly displayed. Alternatively, a subject (such as a company or an individual) identified from the data recorded in the information code C, and information or a graphical form (such as an image of the subject itself, information on the name of the subject (such as the company name or the name of an individual), or a trademark of the subject) identifying the subject may be alternatingly displayed.

According to the above-described embodiments, an example is given in which, in the display processes at S2, S22, S52, S62, S73, S82, S92, and the like, the display state of the display unit 12 is maintained (fixed) in a readable state, in a state in which the information code C of a certain size is continuously displayed in a manner readable by the reading apparatus 20. However, as long as the information code C is continuously or intermittently displayed in a manner readable by the reading apparatus 20, other display processes may be performed in the display process at S2, S22, S52, S62, S73, S82, S92, and the like.

For example, during the period until the display apparatus proceeds to Yes at S3, S23, S53, S63, S74, S83, or S93 after display is started at S2, S22, S52, S62, S73, S82, or S92, display may be performed such that switching is performed every certain amount of time between an information code in a display state in which the concentration of the dark colored cells is dark and an information code in which the concentration of the dark colored cells is lighter, in a state in which the information code is readable by the reading apparatus 20. Alternatively, the information code C may be intermittently displayed in a flashing manner. In this case, during the flashing display, the period over which the information code C disappears is preferably very short. Alternatively, the information code may be continuously or intermittently displayed such as to change in size to a variety of sizes, in a state in which the information code C is readable by the reading apparatus 20.

According to the first embodiment, in the flowchart shown in FIG. 9, after the information code C is displayed in a manner readable by the reading apparatus 20 (that is, after the display at S2 is performed), at S3, the display apparatus 10 determines whether or not the predetermined amount of time has elapsed. However, instead of the determination process at S3, other determination processes may be performed. For example, when the state in which the display unit 12 is oriented at the predetermined orientation (such as vertically downward or vertically downward at an angle) is detected at S1 and the display apparatus 10 proceeds to Yes at S1, when the display unit 12 is detected to be oriented in a direction other than the predetermined orientation, the display apparatus 10 may proceed to Yes at S3. In this case, after the display apparatus 10 proceeds to Yes at S1, the process at S3 is periodically performed at every predetermined short amount of time.

When the display unit 12 remains oriented at the "predetermined orientation", the display apparatus 10 proceeds to No. When the display unit 12 becomes oriented in a direction other than the "predetermined orientation" (such as when a detection is made that the angle $\theta$ exceeds the threshold $\theta a$ over a predetermined amount of time (such as 1 second) or longer), the display apparatus 10 proceeds to Yes at S3. In this example, detection of the state in which the display unit 12 is oriented in a direction other than the "predetermined orientation" corresponds to the "predetermined code display release condition being met".

In addition, the "predetermined code display release condition being met" is not limited to these examples. For example, the "predetermined code display release condition being met" may be a "predetermined operation being performed on the operating unit 13". In this case, instead of the determination process at S3, a "process for determining whether or not a predetermined operation is performed on the operating unit 13" may be performed. When the predetermined operation is performed on the operating unit 13, the display apparatus 10 proceeds to Yes at S3. Otherwise, the display apparatus 10 proceeds to No. This concept can also be similarly applied to other embodiments.

According to the above-described embodiments, the angle $\theta$ formed by the combined acceleration $\alpha s$ and the Z-axis positive direction being 0° or greater and the predetermined threshold $\theta a$ or less is simply detected as the "state in which the display unit is oriented vertically downward or vertically downward at an angle". However, the present invention is not limited to this example. For example, according to any of the embodiments, a stationary state in which, in the state in which the angle $\theta$ formed by the combined acceleration $\alpha s$ and the Z-axis positive direction is 0° or greater and the predetermined threshold $\theta a$ or less, the amounts of change $\Delta \alpha x$, $\Delta \alpha y$, and $\Delta \alpha z$ in the respective accelerations $\alpha x$, $\alpha y$, and $\alpha z$ in the X-, Y-, and Z-axis directions are each less than a predetermined value $\Delta a$ over a certain amount of time (such as 1 second or 0.1 second) may be detected as the "state in which the display unit is oriented vertically downward or vertically downward at an angle". In this case, "when the stationary state in which, in the state in which the angle $\theta$ is 0° or greater and the predetermined threshold $\theta a$ or less, the amounts of change $\Delta \alpha x$, $\Delta \alpha y$, and $\Delta \alpha z$ in the respective accelerations $\alpha x$, $\alpha y$, and $\alpha z$ in the X-, Y-, and Z-axis directions are each less than a predetermined value $\Delta a$ over a certain amount of time, is detected" is "when the orientation of the display unit 12 detected by the direction detecting unit is the predetermined orientation".

In addition, the "direction in which the display unit 12 is oriented when the stationary state in which, in the state in which the angle $\theta$ is 0° or greater and the predetermined threshold $\theta a$ or less, the amounts of change $\Delta \alpha x$, $\Delta \alpha y$, and $\Delta \alpha z$ in the respective accelerations $\alpha x$, $\alpha y$, and $\alpha z$ in the X-, Y-, and Z-axis directions are each less than a predetermined value $\Delta a$ over a certain amount of time, is detected" is the "predetermined orientation".

According to the above-described embodiments, an example is given in which the orientation of the display unit 12 (display unit) is detected by the three-axis sensor 15. However, the present invention is not limited to this example. For example, as shown in FIG. 1, when the display unit 12 is held downward over the reading apparatus 20, which emits an illumination light in the upward direction, and the information code C displayed on the display unit 12 is read, a light quantity sensor may be disposed near the display unit 12. When the quantity of light detected by the light quantity sensor is a certain value or higher, the display apparatus 10 may proceed to Yes at S1, S21, S51, S60, S70, S80 or S90. In this case, when the quantity of light detected by the light quantity sensor is less than the certain value, the display apparatus 10 continues to proceed to No at S1, S21, S51, S60, S70, S80 or S90. In this case, the "orientation at which the light quantity detected by the light quantity sensor becomes the certain value or higher" corresponds to the "predetermined orientation".

According to the above-described embodiments, an example is given of a method in which the orientation of the vertical direction is detected with reference to the display apparatus 10 by an acceleration sensor. However, according to any of the embodiments, various publicly known methods can be used as long as the method enables the vertical direction to be detected. For example, the method may be that in which the vertical direction is identified through use of the acceleration sensor and a geomagnetic sensor. Alternatively, the method may be that in which the vertical direction is identified through use of the acceleration sensor and a gyro sensor. In any of the methods, as long as the vertical direction is identified, the angle $\theta$ formed by the vertical direction and the Z-axis positive direction can be identified.

According to the above-described embodiments, the reading apparatus 20 is disposed in a position below the position of operation by the user. The reading apparatus 20 reads the information code that is held above the reading apparatus 20. However, the present invention is not limited to this example. For example, when the reading apparatus 20 is attached to a wall or the like, and the viewing range of the light receiving sensor 23 is set in a lateral direction (horizontal direction), whether or not an angle β formed by the Z-axis positive direction and the horizontal direction (the direction of a plane perpendicular to the vertical direction) is 0° or greater and a predetermined threshold β1 (such as 20°) or less may be determined at S1, S21, S51, S60, S70, S80, S90, or the like. When determined that the angle β is 0° or greater and the predetermined threshold β1 or less, the display apparatus 10 may proceed to Yes at S1, S21, S51, S60, S70, S80, S90, or the like. Otherwise, the display apparatus 10 may proceed to No. In this case, the orientation of the display unit 12 when the angle β formed by the Z-axis positive direction and the horizontal direction (the direction of a plane perpendicular to the vertical direction) is 0° or greater and a predetermined threshold β1 (such as) 20° or less corresponds to the "predetermined orientation".

EXPLANATION OF REFERENCE NUMBERS

10: portable information code display apparatus
11: control circuit (display control unit functionally realized, direction detecting unit, operation control section functionally realized)
12: display unit
13: operating unit
14: memory (storage unit functionally realized)
15: three-axis sensor (direction detecting unit functionally realized)
16: communication unit
20: information code reading apparatus
50: external apparatus
C: information code

What is claimed is:

1. A portable information code display apparatus comprising:
   a display unit configured to display an image, the display unit including a display;
   a direction detecting unit configured to, at least, detect that the display unit is oriented in a predetermined orientation; and
   a display processor configured to:
   first determine whether the display unit is displaying pre-established information code in a predetermined readable state in which information codes, including the pre-established information code, are readable by an information code reading apparatus;
   first enable the display unit to forcibly switch the display of the display unit from an unreadable state, where the display unit is not displaying the pre-established information code in the predetermined readable state, to a state where the display unit displays the pre-established information code in the predetermined readable state upon (i) determining that the display unit is not displaying the information code in the predetermined readable state, and (ii) the direction detecting unit detecting that the display unit is oriented in the predetermined orientation, the unreadable state including a display mode in which the pre-established information code is not displayed on the display of the display unit; and
   enable the display unit to maintain the display of the pre-established information code in the predetermined readable state when the display of the display unit has been switched to the state where the display unit displays the pre-established information code in the predetermined readable state.

2. The portable information code display apparatus of claim 1, wherein the display processor is configured to:
   second determine the display unit displays either a predetermined default screen or a display screen of an application program that does not involve display of the pre-established information code; and
   second enable the display unit to switch the display of the display unit to the state where the display unit displays the pre-established information code in the predetermined readable state, upon (i) determining that the display unit displays either the predetermined default screen or the display screen of an application program, and (ii) the direction detecting unit detecting that the display unit is oriented in the predetermined orientation.

3. The portable information code display apparatus of claim 1, wherein:
   the display processor is configured to third determine whether a predetermined permission condition is realized in which the pre-established information code is allowed to be displayed; and
   display the pre-established information code on the display unit in the predetermined readable state and maintain the display of the pre-established information code in the predetermined readable state, upon (i) determining that the predetermined permission condition is realized, and (ii) the direction detecting unit detecting that the display unit is oriented in the predetermined orientation.

4. The portable information code display apparatus of claim 1, wherein the display processor is configured to:
   i) switch the display of the display unit into a predetermined suppressed state when a predetermined suppression condition for the display unit is satisfied, and
   ii) terminate the predetermined suppressed state and display the pre-established information code on the display unit in the predetermined readable state while maintaining the display of the pre-established information code in the predetermined readable state, when the direction detecting unit detects that the display unit is oriented in the predetermined orientation, during the predetermined suppressed state of the display unit.

5. The portable information code display apparatus of claim 4, wherein:
   the display includes a backlight;
   the readable state includes a state where light is irradiated from the backlight of the display in a predetermined irradiation state; and
   the display processor is configured to:
   i) perform suppression control of the display when the predetermined suppression condition is satisfied, the suppression control including controlling the backlight of the display unit so as to be turned off or controlling the display unit such that an amount of the light from the backlight is suppressed to be an amount of the light from the backlight that is irradiated in the predetermined irradiation state, and
   ii) terminate the predetermined suppressed state and maintain the display of the pre-established information code on the display unit while the light is irradiated from the backlight of the display unit in the predetermined irradiation state, when the direction detecting unit detects that the display unit is oriented in the predetermined orientation, during the predetermined suppressed state of the display unit.

6. The portable information code display apparatus of claim 1, wherein the display processor is configured to:

i) switch the display of the display unit into a predetermined suppressed state when a predetermined suppression condition for the display unit is satisfied, and ii) prevent the display of the display unit from being switched to the predetermined suppressed state and display the pre-established information code on the display unit in the predetermined readable state while maintaining the display of the pre-established information code in the predetermined readable state, when the predetermined suppression condition is satisfied while the direction detecting unit detects that the display unit is oriented in the predetermined orientation.

7. The portable information code display apparatus of claim 6, wherein:

the display unit includes a backlight;

the readable state includes a state where light is irradiated from the backlight of the display unit in a predetermined irradiation state; and the display processor is configured to:

i) perform suppression control of the display unit when the predetermined suppression condition is satisfied, the suppression control including controlling the backlight of the display unit so as to be turned off or controlling the display unit such that an amount of the light from the backlight is suppressed to be an amount of the light from the backlight irradiated in the predetermined irradiation state, and ii) prevent the backlight from being turned off and the suppression control from being performed, and display the pre-established information code on the display unit in the predetermined readable state while maintaining the display of the pre-established information code in the predetermined readable state, when the predetermined suppression condition is satisfied while the direction detecting unit detects that the display unit is oriented in the predetermined orientation.

8. The portable information code display apparatus of claim 1, wherein:

the direction detecting unit is configured to detect a state where the display unit is oriented vertically downward or obliquely downward; and the display processor is configured to display the pre-established information code on the display unit in the predetermined readable state and maintain the display of the pre-established information code in the predetermined readable state, when the direction detecting unit detects that the display unit is oriented vertically downward or obliquely downward.

9. The portable information code display apparatus of claim 1, wherein the display processor is configured to maintain the display of the display unit for a predetermined period of time in a state where the pre-established information code is displayed continuously, when the direction detecting unit detects that the display unit is oriented in the predetermined orientation.

10. The portable information code display apparatus of claim 1, wherein the display processor is configured to:

control the display unit such that the pre-established information code is displayed in the predetermined readable state and maintain the displayed state of the pre-established information code until a time when a predetermined code display release condition is satisfied, and perform at least one of a predetermined return operation and a predetermined power-saving operation of the display unit when the predetermined code display release condition is satisfied.

11. The portable information code display apparatus of claim 1, wherein the display processor is configured to:

recognize, based on information from the direction detecting unit, a predetermined orientation change of the display unit, the predetermined orientation change showing an orientation change towards the predetermined orientation, and display the pre-established information code on the display unit in the predetermined readable state and maintain the display of the pre-established information code in the predetermined readable state, upon recognizing the predetermined orientation change.

12. The portable information code display apparatus of claim 1, wherein the display processor is configured to:

determine whether the portable information code display apparatus is in a predetermined movement state; and prohibit the pre-established information code from being displayed on the display unit in the predetermined readable state, in response to determining that the portable information code display apparatus is in the predetermined movement state, and when the direction detecting unit detects that the display unit is oriented in the predetermined orientation.

13. The portable information code display apparatus of claim 1, wherein the display processor is configured to:

i) change the display of the display unit between a display state where the pre-established information code is in the predetermined readable state and another display state where a figure or information, which is other than a configuration of the information code, is displayed; and ii) display the pre-established information code on the display unit in the predetermined readable state and maintain the display of the pre-established information code in the predetermined readable state when the direction detecting unit detects that the display unit is oriented in the predetermined orientation.

14. The portable information code display apparatus of claim 1, wherein the display processor is configured to:

i) change the display of the display unit between a display state where the pre-established information code is in the predetermined readable state and another display state where a code region of the pre-established information code is unreadable; and ii) display the pre-established information code on the display unit in the predetermined readable state in which the information is readable and maintain the display of the pre-established information code in the readable state, when, at least, the direction detecting unit detects that the display unit is oriented in the predetermined orientation.

15. The portable information code display apparatus of claim 1, wherein the display processor is configured to correct the image based on an angle between a reference direction for a predetermined direction and a direction of the display unit and display the corrected image on the display unit, when the pre-established information code is displayed in the predetermined readable state.

16. The portable information code display apparatus of claim 1, further comprising:

a memory storing a plurality of types of information codes, the plurality of types of information codes being displayable on the display unit; and a communication device configured to communicate with an external apparatus, wherein the display processor is configured to selectively display, from the memory, one of the plurality of types of information codes on the display unit based on communication performed with the external apparatus via the communication device when the pre-established information code is displayed in the predetermined readable state.

17. The portable information code display apparatus of claim 1, further comprising a memory storing a plurality of types of information codes, the plurality of types of information codes being displayable on the display unit,
wherein the display processor is configured to selectively display, from the memory, one of the plurality of types of information codes on the display unit depending on a direction of the display unit that is detected by the direction detecting unit, when the pre-established information code is displayed in the predetermined readable state.

18. The portable information code display apparatus of claim 1, further comprising an operation unit operated by an operator to permit the pre-established information code to be displayed,
wherein the display processor is configured to (i) prohibit the pre-established information code from being displayed on the display unit when the operation unit is not operated to permit the pre-established information code to be displayed, and (ii) display the pre-established information code on the display unit in the predetermined readable state in which the pre-established information code is readable, while maintaining the display of the pre-established information code in the predetermined readable state, when the operation unit is operated to permit the pre-established information code to be displayed and the direction detecting unit detects that the display unit is oriented in the predetermined orientation.

19. The portable information code display apparatus of claim 1, wherein the predetermined readable state includes one of other display modes consisting of:
a dark image of the pre-established information code that prevents the information code reading apparatus from reading the pre-established information code,
a small image of the pre-established information code that prevents the information code reading apparatus from reading the pre-established information code,
the pre-established information code having a portion that is missing so that the information code reading apparatus is prevented from reading the pre-established information code,
a default image that has no relation to the pre-established information code, or
an image of an application program that does not involve the pre-established information code.

* * * * *